United States Patent
Morrison et al.

(10) Patent No.: US 9,710,869 B2
(45) Date of Patent: Jul. 18, 2017

(54) METHOD, SYSTEM AND APPARATUS FOR RENDERING A GRAPHICAL OBJECT

(71) Applicant: CANON KABUSHIKI KAISHA, Tokyo (JP)

(72) Inventors: Paul William Morrison, St Clair (AU); Lena Qian, Artarmon (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 396 days.

(21) Appl. No.: 13/973,350

(22) Filed: Aug. 22, 2013

(65) Prior Publication Data

US 2014/0055486 A1  Feb. 27, 2014

(30) Foreign Application Priority Data

Aug. 24, 2012 (AU) .................. 2012216432

(51) Int. Cl.
*G06T 1/00* (2006.01)
*G06T 11/40* (2006.01)

(52) U.S. Cl.
CPC ............... *G06T 1/00* (2013.01); *G06T 11/40* (2013.01)

(58) Field of Classification Search
CPC .. G06T 3/00; G06T 3/40; G06T 3/403; G06T 11/00; G06T 11/20; G06T 11/203; G06T 11/40; G06T 15/503; G06T 2200/12; G06T 1/00
See application file for complete search history.

(56) References Cited

U.S. PATENT DOCUMENTS

| | | | |
|---|---|---|---|
| 6,518,974 B2 | 2/2003 | Taylor et al. | |
| 6,577,307 B1 | 6/2003 | Hsiao et al. | |
| 6,985,159 B2 | 1/2006 | Brown | |
| 7,164,430 B2 | 1/2007 | Jiao et al. | |
| 7,564,459 B2 | 7/2009 | Loop et al. | |
| 7,567,248 B1 | 7/2009 | Mark et al. | |
| 8,035,641 B1 | 10/2011 | O'Donnell | |
| 2004/0239672 A1* | 12/2004 | Schmidt | G06T 15/80 345/426 |
| 2006/0061577 A1* | 3/2006 | Subramaniam | G06T 15/005 345/501 |
| 2007/0070082 A1* | 3/2007 | Brennan | G06T 15/503 345/592 |

(Continued)

OTHER PUBLICATIONS

John Recker, I-Jong Lin, Ingeborg Tastl, "A GPU Accelerated PDF Transparency Engine." Proceedings of SPIE-IS&T Electronic Imaging Jan. 2011, SPIE vol. 7872, pp. 78720T-1 to 78720T-11.

(Continued)

*Primary Examiner* — Ke Xiao
*Assistant Examiner* — Jed-Justin Imperial
(74) *Attorney, Agent, or Firm* — Canon USA, Inc. IP Division

(57) ABSTRACT

A method of rendering a graphic object is disclosed. An expanded polygon is formed based on the plurality of polygons generated by tessellating the graphic object. The expanded polygon encompasses sampling points of pixels touched by edges of the graphic object. The expanded polygon is rendered in accordance with a center-intersect pixel placement rule to render the graphic object. Pixels of the expanded polygon violating an area-intersect pixel placement rule are excluded.

22 Claims, 17 Drawing Sheets

(56) References Cited

U.S. PATENT DOCUMENTS

2009/0295828 A1* 12/2009 Koziarz ................. G06T 11/40
                                                                             345/619

OTHER PUBLICATIONS

Jon Hasselgren, et al., "GPU Gems 2: Programming Techniques for High-Performance Graphics and General-Purpose Computation," 1st ed (2005), by M Pharr, R Fernando, ISBN 0-321-33559-7, Chapter 42.; http://http.developer.nvidia.com/GPUGems2/gpugems2_chapter42.html.

* cited by examiner

METHOD, SYSTEM AND APPARATUS FOR RENDERING A GRAPHICAL OBJECT

REFERENCE TO RELATED PATENT APPLICATION(S)

This application claims the benefit under 35 U.S.C. §119 of the filing date of Australian Patent Application No. 2012216432, filed 24 Aug. 2012, hereby incorporated by reference in its entirety as if fully set forth herein.

TECHNICAL FIELD

The present invention relates generally to the field of graphics rendering and, in particular, to a method, apparatus and system for rendering a graphical object. The present invention also relates to a computer program product including a computer readable medium having recorded thereon a computer program for rendering a graphical object.

BACKGROUND

Rasterisation is performed within graphics rendering systems. Rasterisation, also known as scan conversion, is the process of determining which pixels belong to a graphic object. A graphic object may represent a text character, an image, or a shape such as a rectangle. Rasterisation is only concerned with which pixels are activated (drawn), and this depends on the outline of the graphics object only. The outline of a graphic object is often described by a polygon. If the outline contains curves such as Bezier splines, the curves are often converted to a series of straight line segments that approximate the curve.

The colour or appearance of pixels activated by a graphic object depends on factors such as the fill of the object, transparency of the object, and how the object is composited with objects below the object.

Rasterisation can be performed in many different ways. In addition, there are different rules that define the relationship between a pixel and a graphic object that must exist for the pixel to be activated. The different rules are known as pixel placement rules. There are two general pixel placement rules, each with slight variations: centre-intersect pixel placement rule and area-intersect pixel placement rule.

The centre-intersect pixel placement rule specifies that any pixel whose centre lies within the outlines of the graphic object is activated. The centre-intersect pixel placement rule is used by many graphics renderers, graphics libraries and page description languages (PDLs), including OpenGL, DirectX, GDI and XPS. The centre-intersect pixel placement may be implemented in software or hardware, can be executed quickly, and has the advantage that if an object is subdivided into a set of smaller objects, the smaller objects cause exactly the same pixels to be activated, with no gaps or overlaps.

The area-intersect pixel placement rule specifies that any pixel whose area intersects the graphic object is activated. The area-intersect pixel placement rule is more difficult to implement than the centre-intersect placement rule. The area-intersect pixel placement rule has the advantage that all objects will be rendered, no matter how small the objects are or the relationship of the objects with the underlying pixel grid. The area-intersect pixel placement rule is used by PostScript and Adobe® PDF, which are the page description languages (PDLs) most commonly used for printing.

Most existing graphics renderers contain rasterisers that rasterise exclusively using the centre-intersect pixel placement rule. It is often difficult or impossible to replace the centre-intersect rasteriser with an area-intersect rasteriser, which is disadvantageous when using existing graphics renderers for print rendering.

In one known method, a graphic object is first decomposed into a set of rectangles whose edges are aligned to the pixel grid. When the rectangles are rasterised using a centre-intersect rasteriser, the output pixels adhere to the area-intersect pixel placement rule. The disadvantage of such methods is that the graphic object must be pre-rasterised to generate the rectangles. The rectangles are then rasterised a second time, incurring a performance penalty.

SUMMARY

It is an object of the present invention to substantially overcome, or at least ameliorate, one or more disadvantages of existing arrangements.

According to one aspect of the present disclosure, there is provided a method of rendering a graphic object, said method comprising:
tessellating the graphic object into a plurality of polygons;
forming a plurality of expanded polygons based on the plurality of polygons, said expanded polygons encompassing sampling points of pixels touched by edges of the graphic object; and
rendering the plurality of expanded polygons for rendering the graphic object in accordance with a centre-intersect pixel placement rule, wherein pixels of the plurality of expanded polygons violating an area-intersect pixel placement rule are excluded.

According to another aspect of the present disclosure, there is provided an apparatus for rendering a graphic object, said system:
a memory for storing data and a computer program;
a processor coupled to the memory for executing the computer program, said computer program comprising steps of:
tessellating the graphic object into a plurality of polygons;
forming a plurality of expanded polygons based on the plurality of polygons, said expanded polygon encompassing sampling points of pixels touched by edges of the graphic object; and rendering the plurality of expanded polygons for rendering the graphic object in accordance with a centre-intersect placement rule, wherein pixels of the plurality of expanded polygon violating an area-intersect pixel placement rule are excluded.

According to still another aspect of the present disclosure, there is provided a non-transitory computer readable medium having a computer program stored thereon for rendering a graphic object, said program comprising a code to execute steps of:
tessellating the graphic object into a plurality of polygons;
forming a plurality of expanded polygons based on the plurality of polygons, said the plurality of expanded polygons encompassing sampling points of pixels touched by edges of the graphic object; and
rendering the plurality of expanded polygons for rendering the graphic object in accordance with a centre-intersect placement rule, wherein pixels of the plurality of expanded polygons violating an area-intersect pixel placement rule are excluded.

Other aspects of the invention are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
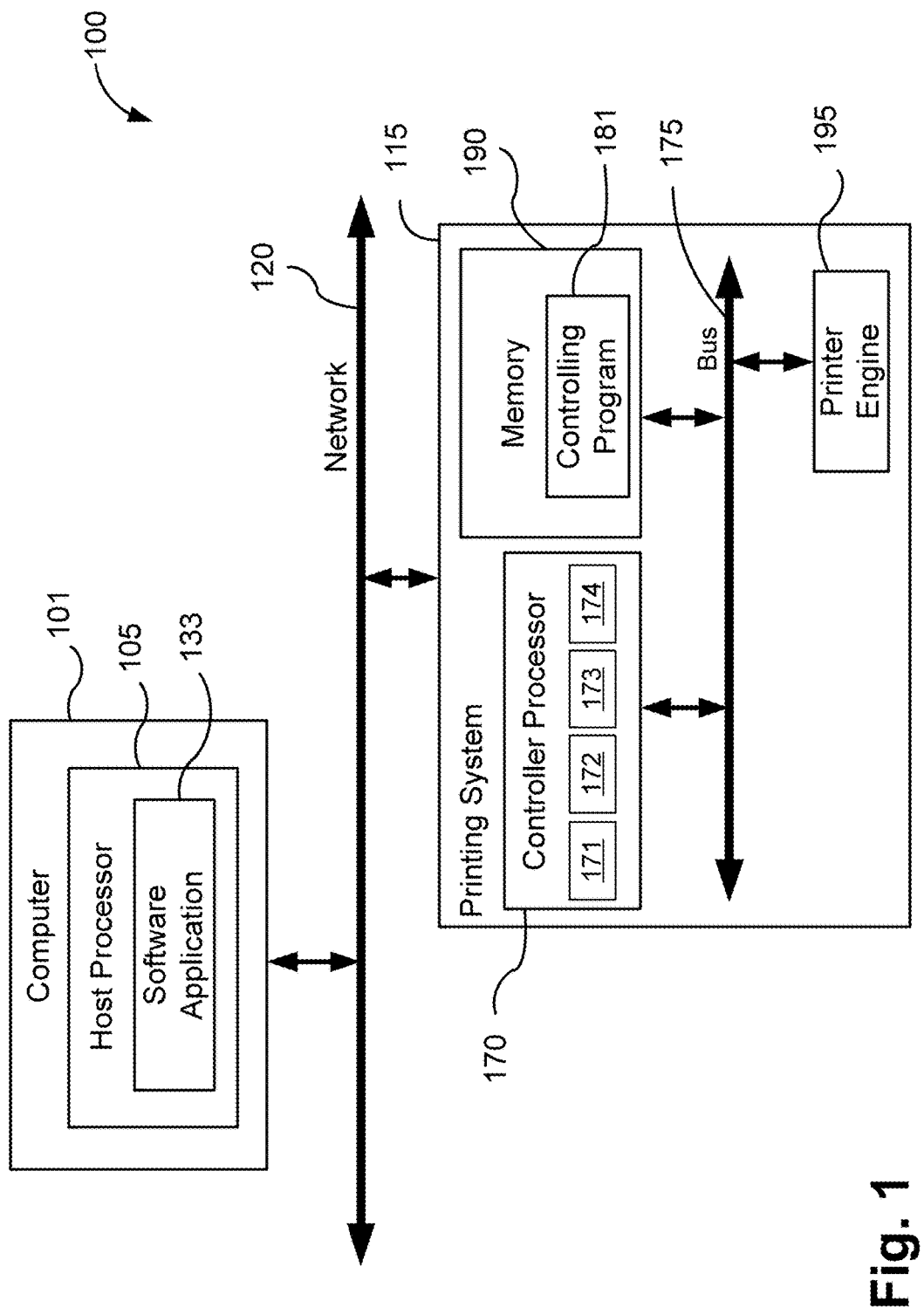
FIG. 1 shows a schematic block diagram of a multi-processor printing system for rendering graphic objects of a page.

Where reference is made in any one or more of the accompanying drawings to steps and/or features, which have the same reference numerals, those steps and/or features have for the purposes of this description the same function(s) or operation(s), unless the contrary intention appears.

A method 500 of rendering an object is described below with reference to FIG. 5. In accordance with the method 500, an expansion step is performed before rasterisation, while a correction step is performed following rasterisation. The output of the method 500 are pixels that adhere to the area-intersect pixel placement rule. An example comparing the output of rendering graphical objects in accordance with the centre-intersect and area-intersect pixel placement rules will be described later with reference to FIG. 12.

The described methods may be implemented within a print rendering system, using the OpenGL rendering pipeline executed on a graphics processing unit (GPU). Alternatively, the described methods may be implemented in other configurations, such as a display rendering system that uses a central processing unit (CPU) renderer.

FIG. 1 shows a schematic block diagram of a pixel rendering system 100 for rendering graphic objects. The pixel rendering system 100 comprises a computer module 101 connected to a printer system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and a printing system (e.g., 115).

The computer module 101 comprises at least one host processor 105 for executing a software application 133, such as a word processor or graphical software application.

The printing system 115 comprises a multi-core controller processor 170. As shown in FIG. 1A, the controller processor 170 comprises four processors 171, 172, 173 and 174, for executing one or more software code modules forming a controlling program 181 which is stored in a memory 190. Alternatively, the controller processor 170 may comprise processors that take the form of single-core CPUs, GPUs, or any other form of computer processor such as field-programmable gate arrays (FPGAs). In another alternative, the controller processor 170 may comprise a mixture of the various kinds of processors described above.

The printing system 115 also has a printer engine 195 coupled to the controller processor 170, via an interconnected bus 175. The controlling program 181 accepts a printable page produced by a software application 133 and produces pixel data values for printing. The pixel data values may then be stored in memory 190 and reproduced as pixels by the printer engine 195, for example. The controlling program 181 may be executed by the controller processor 170 in one or more threads of execution. A thread consists of a number of instructions or steps that are executed in sequence by one of the processors 171-174. The controlling program 140 will be further described in detail below with reference to FIG. 2.

Figure 3A:
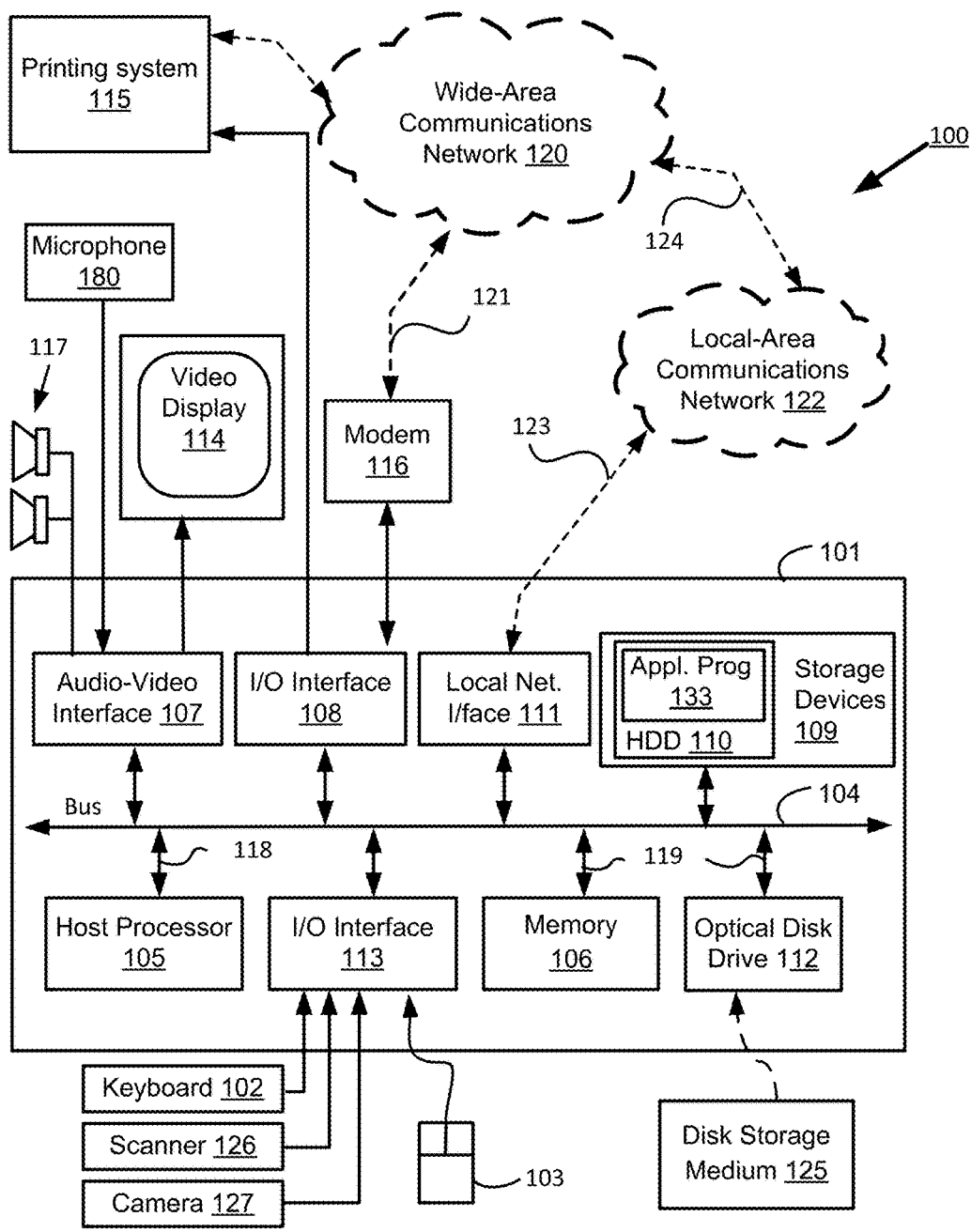
FIGS. 3A and 3B collectively form a schematic block diagram of the general purpose computer system of FIG. 1 in more detail.

As seen in more detail in FIG. 3A, the pixel rendering system 100 includes: the computer module 101; input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printing system 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or alike computer systems.

Methods described below may be implemented using the system 100 wherein one or more steps of the processes of FIGS. 2 and 4 to 16, to be described, may be implemented as one or more code modules of the software application program 133 executable within the system 100. One or more of the steps of the described methods may be effected by instructions 131 (see FIG. 3B) in the software 133 that are carried out within the system 100.

As also described below, one or more steps of the processes of FIGS. 2 and 4 to 16, to be described, may be implemented as one or more of the code modules forming the controlling program 181 executable within the printing system 115. Again, one or more of the steps of the described methods may be effected by instructions, similar to the instructions 131 in the software 133.

The software instructions 131 implementing the software 133 may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application program 133 and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
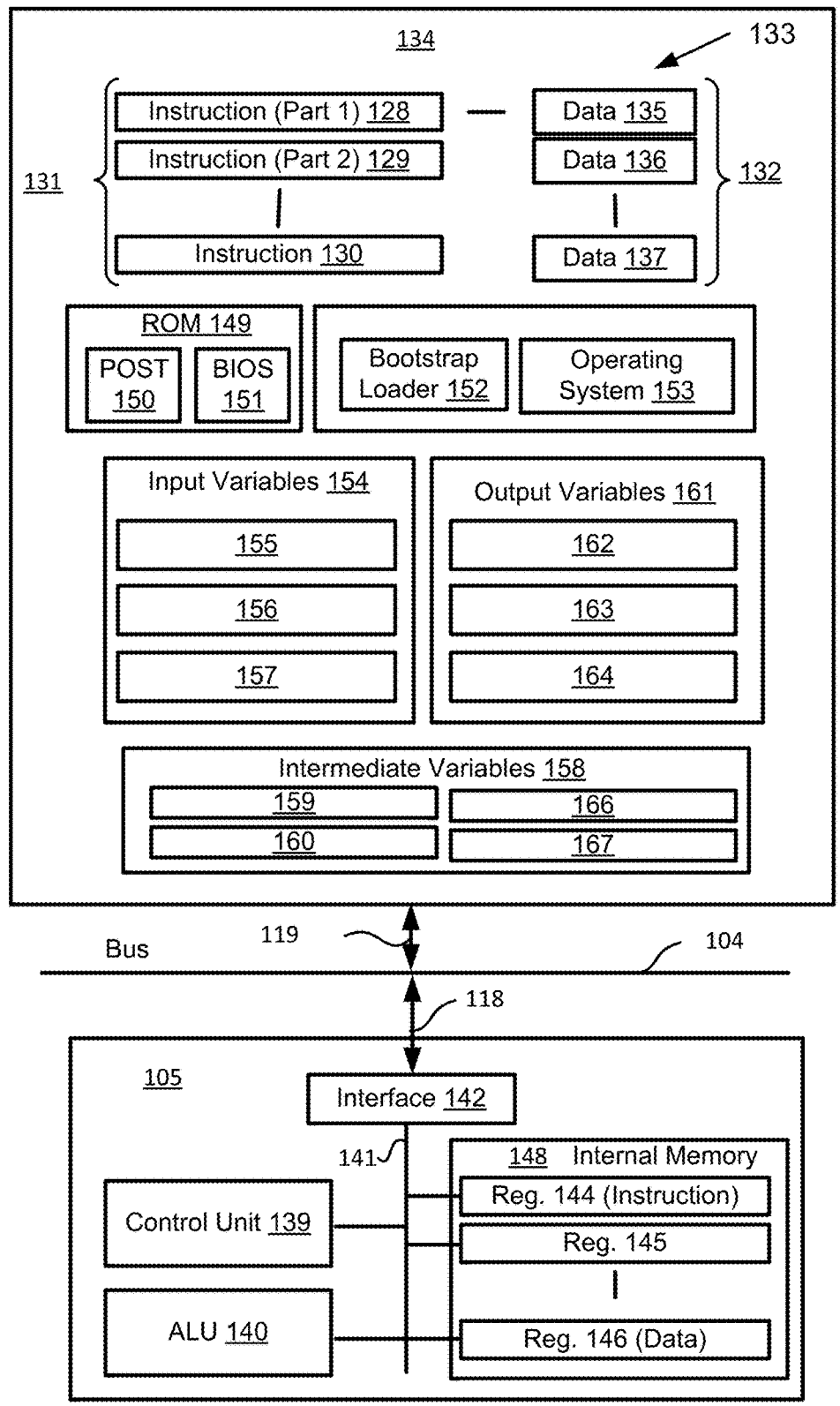

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 3A need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2 and 4 to 16 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

As described above, one or more steps of the processes of FIGS. 2 and 4 to 16, to be described, may be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the controller processor 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
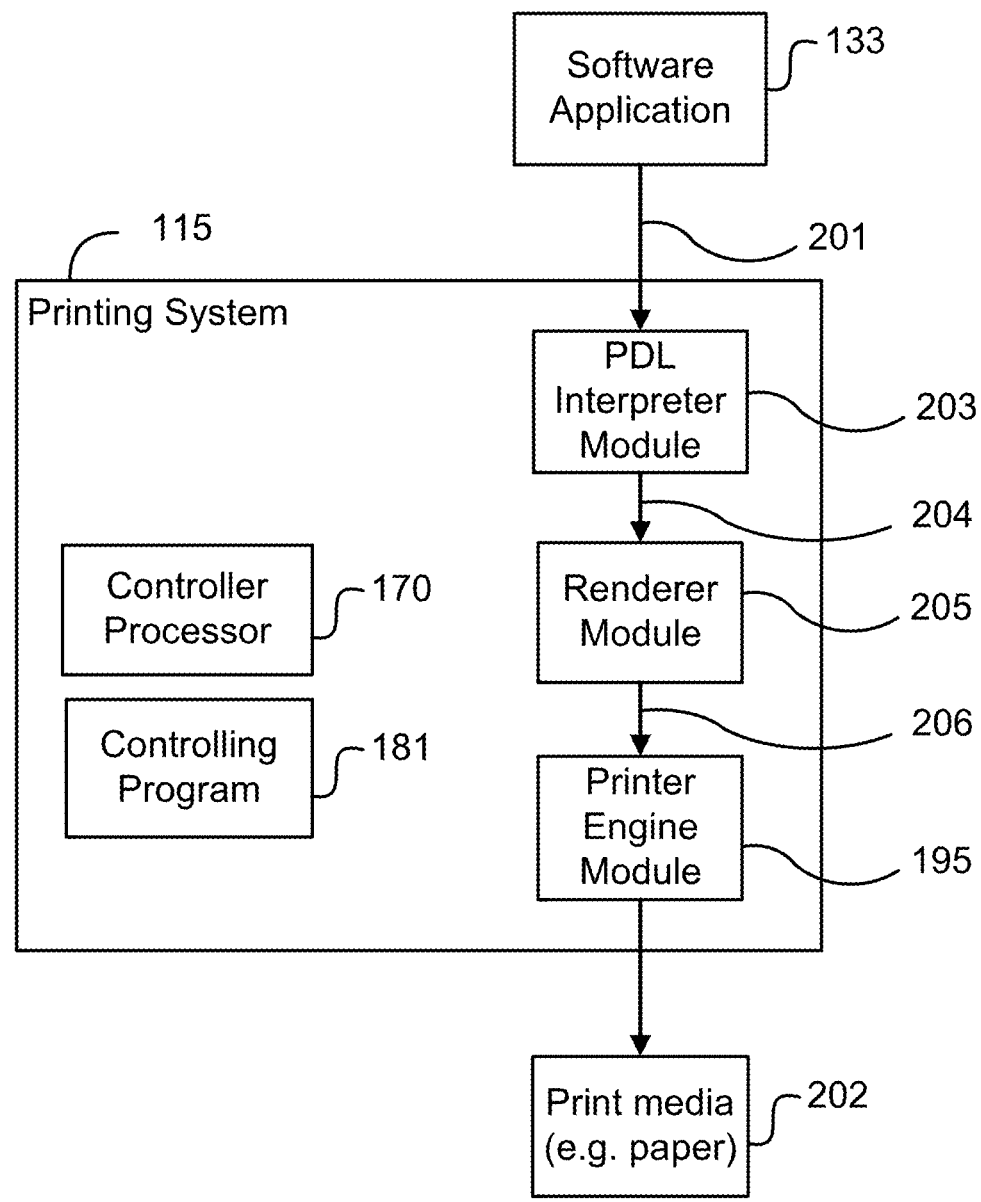
FIG. 2 shows a software architecture for the printing system of FIG. 1.

FIG. 2 shows a software architecture for printing a printable page 201 using the printing system 115. Each of the modules 203 and 205 described below may be formed by one or more of the code modules of the controlling program 181.

The software application 133, for example, executing on the computer module 101, provides the printable page 201 to the printing system 115 for printing to a print media 202, such as a paper sheet. The printable page 201 is typically provided in the form of a description of the printable page 201, the description being specified using a Page Description Language (PDL), such as Adobe® PDF or Hewlett-Packard® PCL. The PDL provides descriptions of graphic objects to be rendered onto the print media 202 in a rendering (or z) order, as opposed to a raster image (i.e. a bitmap of pixel values) of the page to be printed. The printable page 201 may be the whole or part of a print job created by the software application 133 executing in the computer module 101.

A PDL interpreter module 203 receives the printable page 201 and generates graphic objects 204 to be printed. The printing system 115 then uses a renderer module 205 to render the graphic objects 204 to a raster image representation 206 comprising pixel data. The pixel data is printed to the print media 202, such as paper, using a printer engine module 195. The printer engine module 195 may, for example, be an electro-photographic engine.

The PDL interpreter module 203 and renderer module 205 may be implemented as one or more code modules of the controlling program 181 which is executed by the controller processor 170 within the printing system 115. The renderer module 205 will be described in more detail later with reference to FIGS. 4 and 5. Operation of the printing system 115 is similar to that of the computer module 101 in terms of storage and execution of the controlling program 181 by the memory 190 and the controller processor 170 respectively. However, the controlling program 181 is typically multi-threaded with distinct program threads executing on corresponding ones of the multiple processors 171-174 making up the controller processor 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

Returning to FIG. 1, in the pixel rendering system 100, the software application 133 creates printable pages for printing, such as printable page 201. The printable page 201 often contains graphic objects such as text, lines, fill regions, and image data. The software application 133 sends a high-level description of the printable page (e.g., a PDL file) via the network 120 to the controlling program 181 that is executed by the controller processor 170 of the printing system 115. The printable page 201 contains all information required by the pixel rendering system 100 to render and print the page.

In alternative arrangements, the printing system 115, the controller processor 170 and controlling program 181, may be resident in separate servers connected to the network 120. In still another alternative arrangement, the printing system 115, the controller processor 170 and controlling program 181 may be resident in a distributed network of servers. In such systems, the raster image representation produced by the controlling program 181 is sent to the printer engine module 195 via a network rather than the bus 175.

The described methods may also be implemented as part of other graphics rendering systems in which area-intersect pixel placement is required (e.g. for displaying PDF documents on an LCD display). As such, the described methods are not limited to printing systems.

Figure 4:
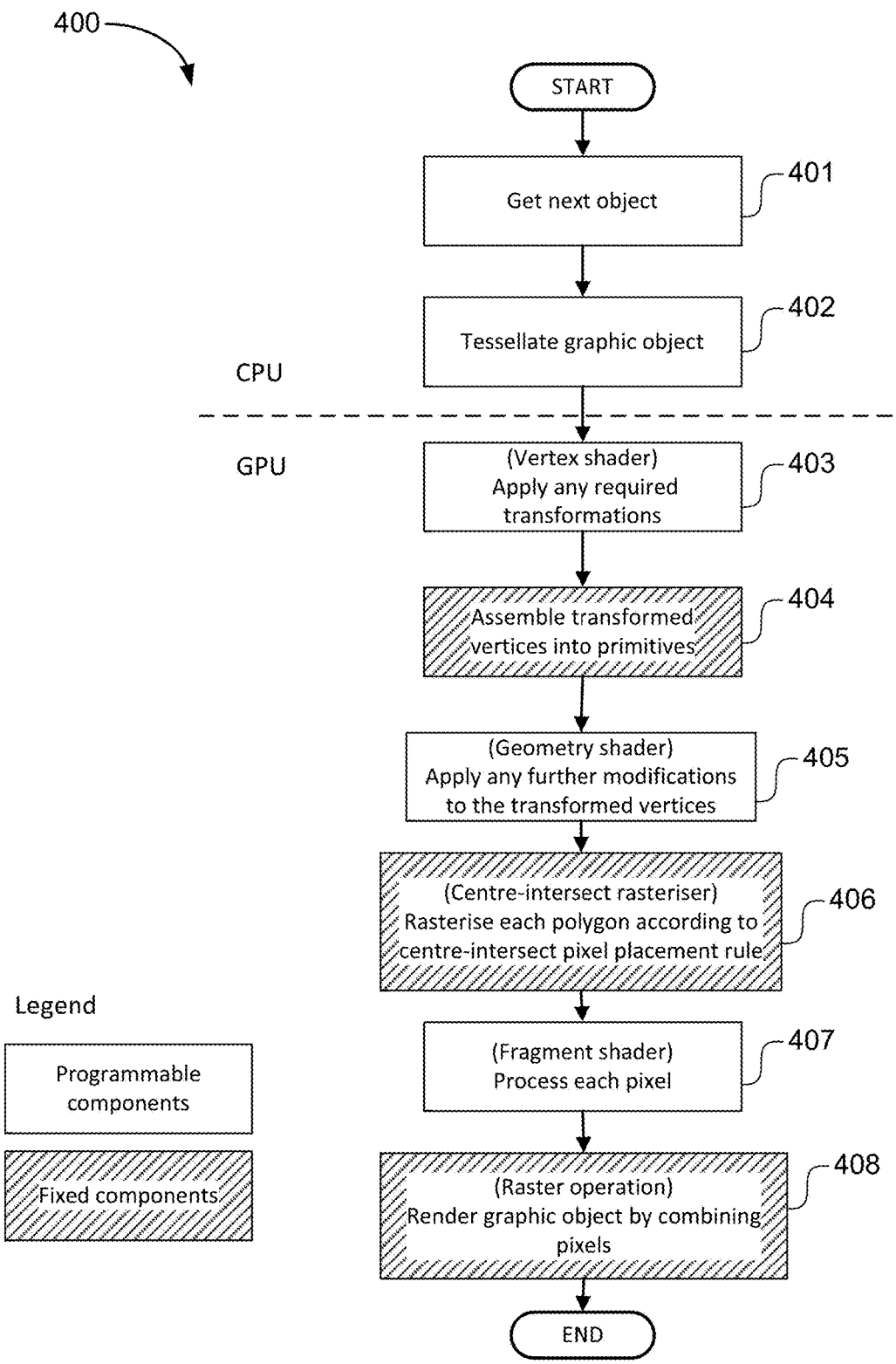
FIG. 4 is a flow chart showing a method of rendering a graphical object.

FIG. 4 is a flow diagram showing a method 400 of rendering a graphical object. The method 400 may be implemented in the form of the renderer module 205 component of the printing system 115. As described above, the renderer module 205 may be formed by one or more code modules of the controlling program 181.

In one arrangement, steps 401 and 402 are executed by a CPU controller processor (e.g., the processor 171 of the controller processor 170 may be a CPU controller processor), and steps 403 to 408 are executed by a GPU controller processor (e.g., the processor 172 of the controller processor 170 may be a GPU controller processor). However, the method 400 will be described generically as being controlled in its execution by the controller processor 170.

In the example of FIG. 4, steps 403-408 are part of the OpenGL rendering platform, where steps 403-408 show an OpenGL rendering pipeline. In alternative arrangements, the described methods may be implemented using CPU controller processors exclusively.

The method 400 starts at get next object step 401, where the next graphic object 204 is retrieved from the PDL interpreter module 203 under execution of the controller processor 170. The next graphic object 204 may be stored in the memory 190.

Processing then proceeds to tessellation step 402, where controller processor 170 is used for tessellating the graphic object retrieved at step 401 into a plurality of polygons. At the tessellation step 402, the graphic object is decomposed into a number of non-overlapping polygons, under execution of the controller processor 170. The polygons may be stored within the memory 190. The polygons are a simpler representation of the graphic object that can be rendered independently using the remaining steps of the method 400. The vertices of the polygons are passed to vertex shader step 403.

At the vertex shader step 403, any required transformation is applied to the vertices of the tessellated graphic object, under execution of the controller processor 170. Such a transformation commonly involves projecting the vertex coordinates to the rendering coordinate system. The transformed vertices may be stored within the memory 190.

The method 400 then proceeds to step 404, where the transformed vertices are assembled into primitives, under execution of the controller processor 170, and the primitives are stored within the memory 190. In OpenGL, there are three types of primitives: points, lines and triangles. When rendering a solid graphic object, triangle primitives (polygons) are typically assembled. The method 500 described below may be used for rendering graphic objects defined by polygons.

The method 400 then proceeds to geometry shader step 405, where further modifications are applied to the transformed vertices, under execution of the controller processor 170. A geometry shader component of OpenGL, implementing the step 405, is typically able to apply further modifications to polygon vertices with knowledge of all vertices that form a polygon. Commonly, such a geometry shader component is used to produce additional polygons.

At step 406, each polygon is rasterised in accordance with the centre-intersect pixel placement rule (e.g., using a centre-intersect rasteriser module), under execution of the controller processor 170. In particular, at step 406, a polygon is converted to a number of discrete fragments (pixels) that are deemed to be part of the polygon. A pixel is deemed to be part of the polygon if the sampling point of the pixel is within the outline of the polygon (i.e., the polygon is encompassing the sampling point of the pixel). In one arrangement, the sampling point of a pixel is the centre of the pixel. In other arrangements, the sampling point of a pixel may be a corner of the pixel or any other location within the pixel. The process performed at step 406, also known as "sampling", produces pixels that will be used by subsequent steps to render the graphic object retrieved at step 401. Pixels produced at step 406 may be stored within the memory 190.

The method 400 then proceeds to the fragment shader step 407, where each pixel produced at step 406 is processed, under execution of the controller processor 170. The processing performed at step 407 typically involves determining colour of the pixel. For example, if the graphic object is rendered using an image or texture, the texture will be sampled at the location of a pixel to determine colour of the pixel. Also at fragment shader step 407, any pixels that should not be activated are discarded. Step 407 may be implemented by a programmable fragment shader component of OpenGL. Pixels produced at step 407 may be stored within the memory 190.

At raster operation step 408, the pixels produced at the fragment shader step 407 are combined, under execution of the controller processor 170, with the pixels that have previously been activated for previous graphic objects. Step 407 may involve compositing the colour of a pixel with the colour of the existing pixel at the same location, and writing the resulting colour to a buffer containing the raster image representation 206. Once all graphic objects have been rendered in accordance with steps 401-408, the raster image representation 206 contains the complete rendered page. The raster image representation 206 may then be sent to the printer engine module 195 for printing to the print media 202.

The steps of FIG. 4 represent an OpenGL rendering pipeline, which comprises both programmable and fixed components. Steps 404, 406 and 408 are implemented by fixed components of the OpenGL rendering pipeline and are shown hatched in FIG. 4. Steps 403, 405 and 407 are implemented by programmable components of the OpenGL rendering pipeline (e.g., a programmable geometry shader, a programmable fragment shader) which are able to be altered, while the fixed components are unable to be changed. The inability to change the fixed components presents a problem when behaviours exhibited by the fixed components do not suit the rendering requirements. More specifically, the rendering of PDF documents requires the area-intersect pixel placement rule, which cannot be implemented in conventional renderers that use a centre-intersect rasteriser.

A centre-intersect rasteriser of many rendering pipelines, including OpenGL, is fixed. The method 400 described above with reference to FIG. 4 is therefore unable to render PDF documents correctly.

Figure 5:
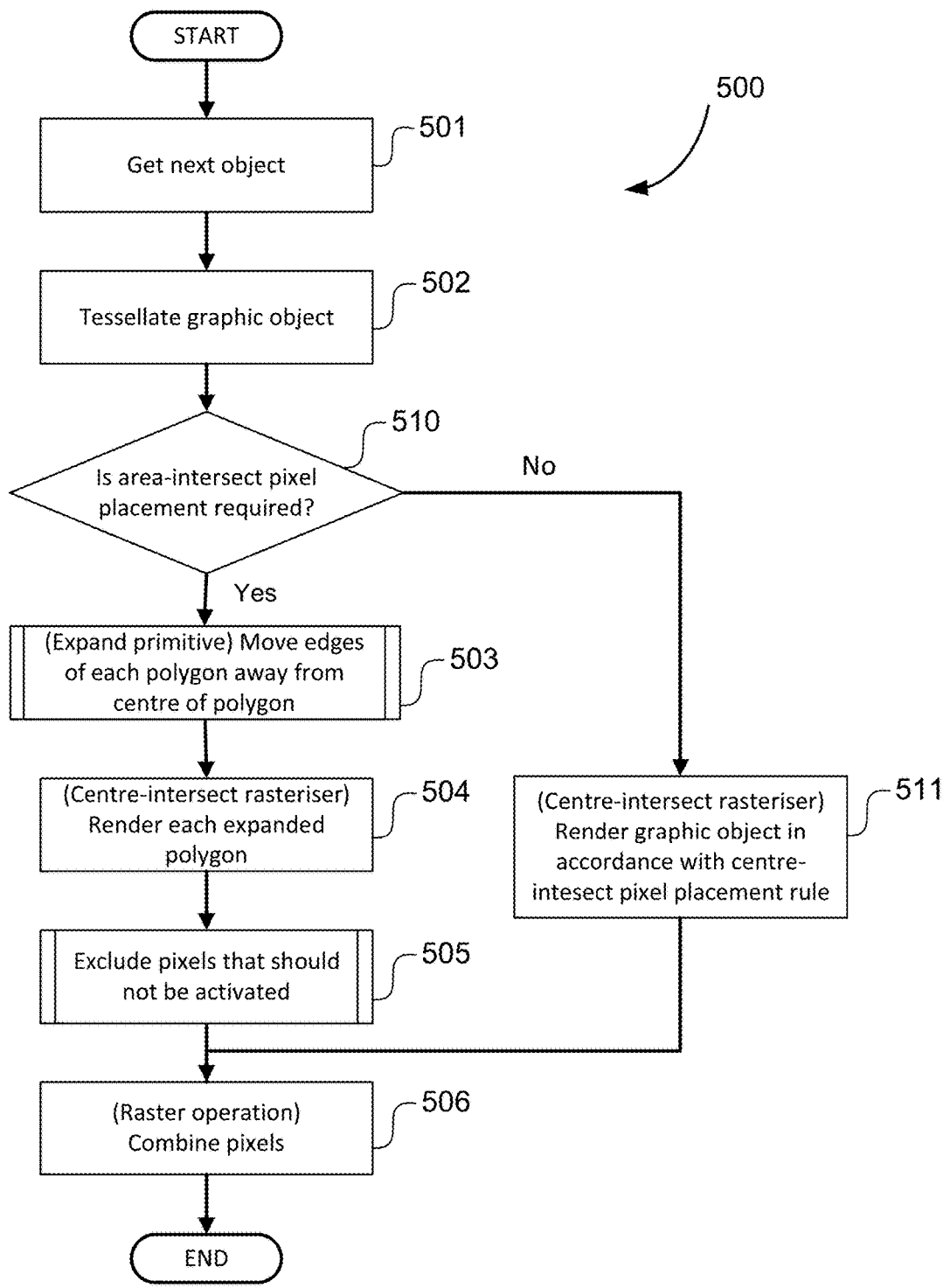
FIG. 5 is a flow chart showing another method of rendering a graphical object.

FIG. 5 shows a method 500 of rendering a graphical object. The method 500 may be implemented by the renderer module 205 resident within the memory 190 and being controlled in its execution by the processor controller 170 of the printing system 115. The renderer module 205 may be formed by one or more software code modules of the controlling program 181.

The method 500 may be used to render graphic objects in accordance with the area-intersect pixel placement rule. As described below, the method 500 may be implemented using a centre-intersect rasteriser, and may therefore be implemented as part of many existing rendering pipelines such as OpenGL.

In one arrangement, steps 501 and 502 may be executed by a CPU controller processor (e.g., the processor 171 of the controller processor 170 may be a CPU controller processor), and steps 503 to 511 may be executed by a GPU controller processor (e.g., the processor 172 of the controller processor 170 may be a GPU controller processor). In alternative arrangements, the steps of the method 500 may be implemented using CPU controller processors. The method 500 will be described generically as being controlled in its execution by the controller processor 170.

The method 500 starts at step 501, where the next graphic object 204 is retrieved from the PDL interpreter module 203 under execution of the controller processor 170. The graphic object 204 may be stored within the memory 190.

Processing then proceeds to step 502, where the graphic object retrieved at step 501 is tessellated to form one or more polygons, under execution of the processor controller 170, and stored within the memory 190. If the outline of the graphic object retrieved at step 501 is a simple polygon, tessellation step 502 may be skipped.

As described above, steps 501 and 502 may be executed using a CPU controller processor in a similar manner to steps 401 and 402 of the method 400. Alternatively, tessellation step 502 may be performed using a GPU process controller. The polygons produced by tessellation step 502 may be stored within the memory 190 and passed to following steps in the method 500.

At decision step 510, if the renderer module 205, under execution of the controller processor 170, determines that area-intersect pixel placement rule is required to rasterise the graphic object 204, then the method 500 proceeds to expansion step 503. The requirement of the area-intersect pixel placement rule is generally specified by the printable page 201 that is in the form of a PDL.

Following steps of the method 500 are configured for forming one or more expanded polygons based on the graphic object 204, where the expanded polygons encompass sampling points (e.g., pixel centres) of pixels touched by edges of the graphic object. In particular, at expansion step 503, each of the plurality of polygons produced by tessellation step 502 is expanded, by the renderer module 205 under execution of the controller processor 170. At the expansion step 503, the edges of each of the polygons are moved away from the centre of the polygon, and the vertices of each new expanded polygon are output to memory 190. An expanded polygon is larger than an unexpanded polygon, and therefore will produce more pixels when rasterised. The vertices of each new expanded polygon may be stored within the memory 190.

Step 503 is executed so that at centre-intersect rasteriser step 504, pixels whose areas touch or intersect the unexpanded polygon may be produced. A method 600 of expanding a polygon, as executed at expansion step 503, will be described in more detail below with reference to FIG. 6. The expansion step 503 may be implemented using the geometry shader component of the OpenGL rendering pipeline.

The method 500 then proceeds to step 504, where each of the expanded polygons is rendered by the renderer module 205, under execution of the controller processor 170, in accordance with the centre-intersect pixel placement rule (e.g., using a centre-intersect rasteriser) to render the graphical object. Accordingly, at step 504, the renderer module 205 under execution of the controller processor 170, is configured for rendering each of the plurality of expanded polygons for rendering the graphic object 204 in accordance with centre-intersect placement rule.

The pixels produced at the centre-intersect rasteriser step 504 may be stored within the memory 190 and passed to correction step 505. At correction step 505, the pixels that should not be activated according to the area-intersect pixel placement rule are excluded (or discarded) by the renderer module 205 under execution of the controller processor 170. In particular, pixels of the plurality of expanded polygons violating the area-intersect pixel placement rule are excluded (e.g., the pixels may be discarded from the memory 190). A method 800 of excluding pixels, as executed at step 505, will be described in more detail below with reference to FIG. 8. The correction step 505 may be implemented using the programmable fragment shader component of the OpenGL rendering pipeline.

The method 500 then proceeds to raster operation step 506, where the pixels produced by the correction step 505 are combined by the renderer module 205 with the pixels that have previously been activated for previous graphic objects, under execution of the controller processor 170. The combined pixels may be stored within the memory 190.

If, at decision step 510, it is determined that the graphic object 204 does not need to be rasterised using the area-intersect pixel placement rule, then the method 500 proceeds to step 511, where the graphic object 204 is rendered in accordance with the centre-intersect pixel placement rule.

Upon completion of step 511, the method 500 proceeds to step 506, which was described above. The method 500 ends upon completion of step 506.

Once all graphic objects of a page have been rendered in accordance with the method 500, the raster image representation 206 contains the complete rendered page. The raster image representation 206 may then be sent to the printer engine 195 for printing to the print media 202.

The raster image representation 206 produced in accordance with the method 500 adheres to the area-intersect pixel placement rule, for those graphic objects that require the area-intersect pixel placement rule. The method 500 can therefore be used to render PDF documents correctly. As described previously, expansion step 503 and correction step 505 may be implemented using the programmable geometry shader and fragment shader components of OpenGL, respectively. The method 500 may therefore be implemented within many existing rendering pipelines, such as OpenGL.

Figure 6:
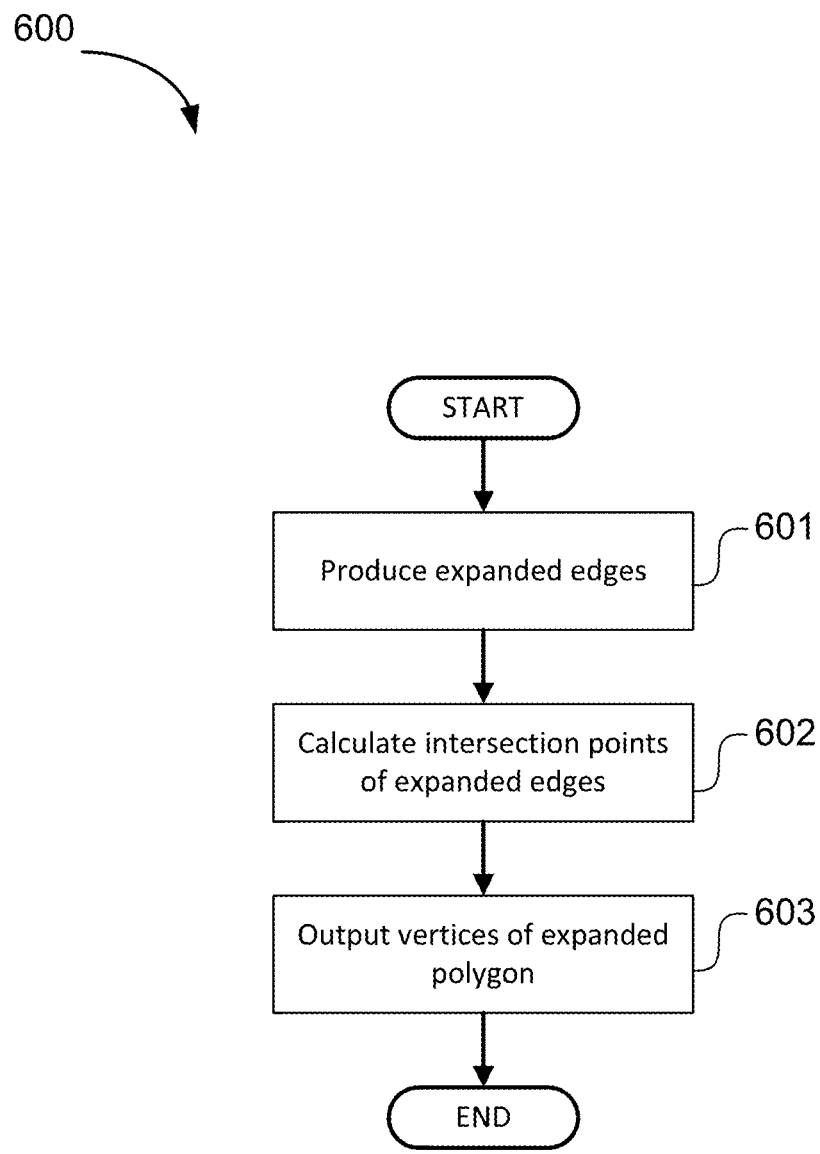
FIG. 6 is a flow chart showing a method of expanding a polygon as executed in the method of FIG. 5.

The method 600 of expanding a polygon, as executed at step 503, will now be described with reference to FIG. 6. As described above, the method 600 may be implemented in the form of the renderer module 205 resident within the memory 190 and being controlled in its execution by the controller processor 170. As described above, the renderer module 205 may be formed by one or more software code modules of the controlling program 181. In the methods and examples described below, the sampling point is the pixel centre. Similar techniques may be applied when the sampling point is not the pixel centre.

The method 600 is configured for forming edges of the expanded polygons based on edges of the graphic object being rendered, where if any pixel touches the edge of the graphic object without overlapping the graphic object, a sampling point of the touching pixel is intersected by the corresponding edge of the expanded polygon. In accordance with the method 600, endpoints of an edge of the expanded polygon are moved by a distance from an endpoint to a pixel sampling point in a direction of a normal of the edge of the expanded polygon.

The method 600 begins at step 601, where endpoints of each of the edges of the polygon are moved in the direction of the normal of the edge by (±0.5, ±0.5), by the renderer module 205 under execution of the controller processor 170. The normal of an edge is perpendicular to the edge, with a direction towards the exterior of the polygon. Step 601 results in expanded edges that are parallel to the original unmoved edges. The centre of any pixel that touches, but does not overlap the polygon along the original unmoved edge will be located on the expanded edge. Details of the expanded edges may be stored within the memory 190.

The method 600 then proceeds to step 602, where the intersection points of the expanded edges are determined by the renderer module 205 under execution of the controller processor 170. As described in detail below, step 602 is configured for determining the intersection points of adjacent edges of the expanded polygons. The intersection points may be determined using any suitable method of determining the intersection point of two lines. The intersection points of the expanded edges are the vertices of the expanded polygon. The intersection points determined at step 602 may be stored within the memory 190.

At the next step 603, the vertices of the expanded polygon are output to the next step 504 of the method 500. The method 600 will now be further described by way of example with reference to FIG. 7. In particular, an example of expanding a polygon according to the method 600 will now be described.

Graphic object 710 is described by a polygon with three edges 711-713. Edge 711 has two endpoints 720 and 721. Edge 711 has normal 730 away from the centre of the graphic object 710. Although many of the examples used to explain the described method use polygons with three edges (triangles), the described methods may be applied to any polygon (e.g., concave polygons).

Figure 7:
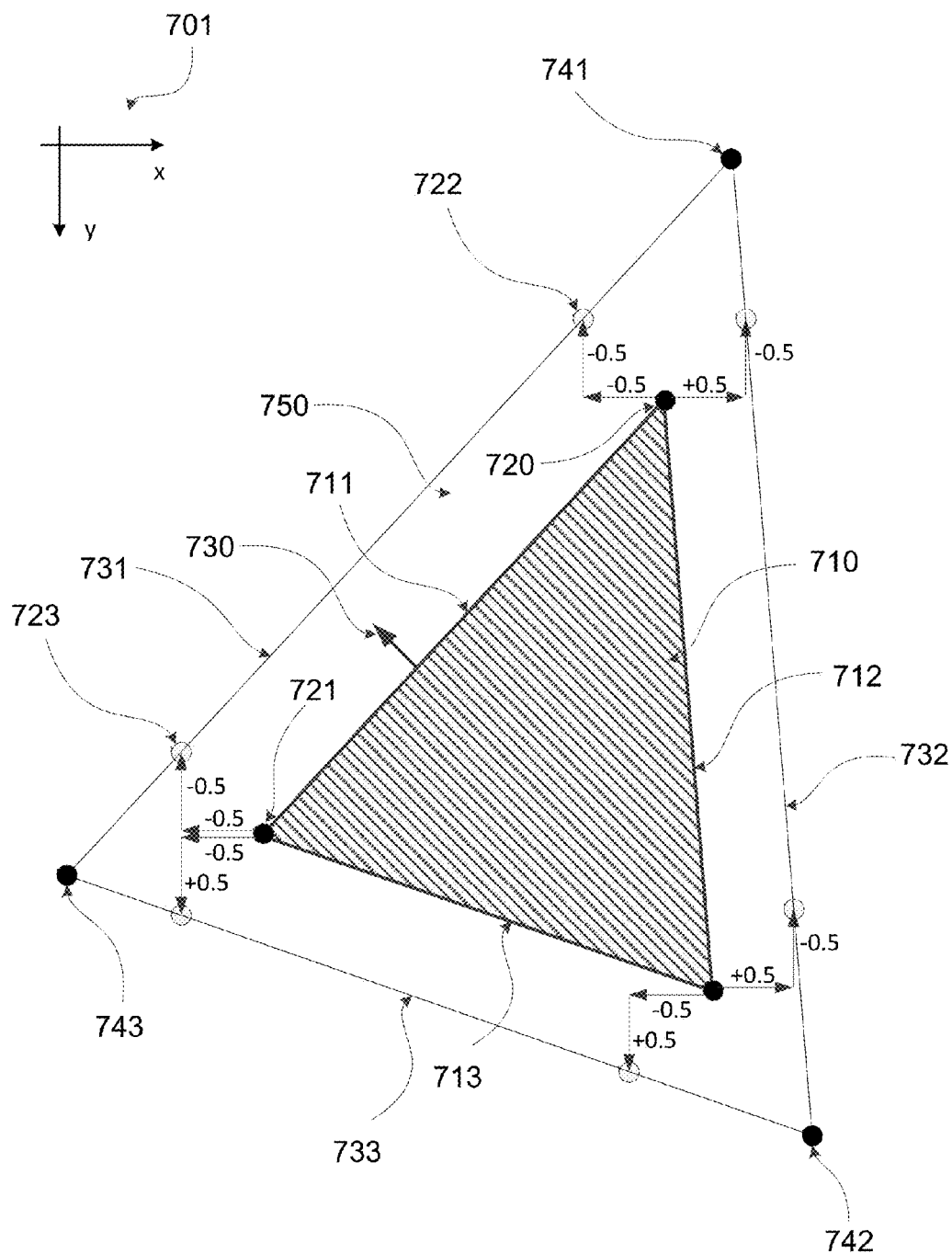
FIG. 7 shows an example of expanding a polygon.

An example of producing the expanded edges for the graphic object 710, as at step 601 of the method 600, will now be described. The normal 730 has an x-component that is negative, and a y-component that is negative, according to the coordinate system 701 that has an origin in the top-left. As seen in FIG. 7, the endpoints 720 and 721 are moved by −0.5 in the x-direction and −0.5 in the y-direction, as at step 601 of the method 600. Moving the endpoints 720 and 721 results in expanded endpoints 722 and 723, respectively. The expanded edge 731 passes through the expanded endpoints 722 and 723. At step 601, the endpoints of other edges 712 and 713 are moved outward in a similar manner. The endpoints of edge 712 are moved by (+0.5, −0.5), resulting in expanded edge 732. The endpoints of edge 713 are moved by (+0.5, −0.5), resulting in expanded edge 733.

An example of calculating the intersection points of the expanded edges 731, 732 and 733 for the graphic object 710, as at step 602, will now be described. Since edge 711 is adjacent to edge 712, expanded edge 731 is adjacent to expanded edge 732. The intersection point of expanded edges 731 and 732 is therefore calculated. As described above, the intersection point may be calculated using any suitable method. The intersection point 741 of expanded edges 731 and 732 is shown in FIG. 7. Intersection points 742 and 743 may be similarly calculated. The intersection points are the vertices that define the expanded polygon 750.

Figure 8:
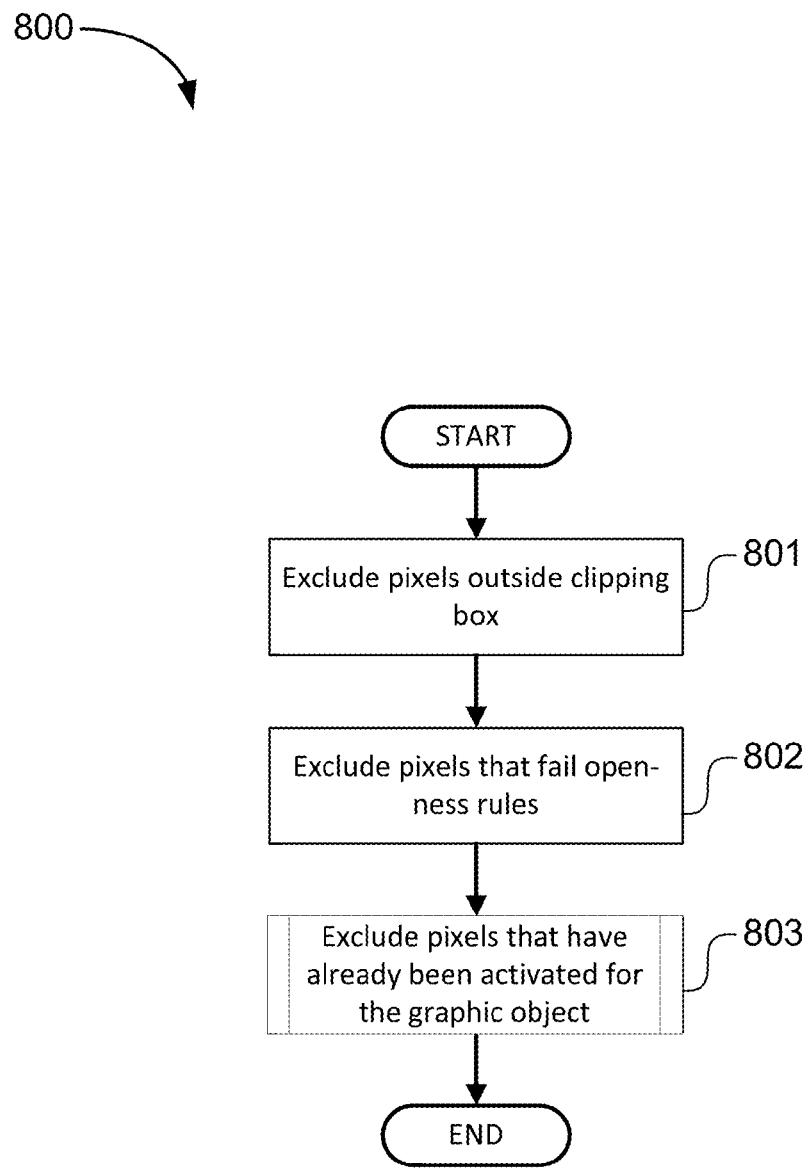
FIG. 8 is a flow chart showing a method of excluding pixels output by a centre-intersect rasteriser.

The method 800 of excluding pixels, as executed at step 505, will now be described with reference to FIG. 8. The method 800 corrects the rasterised pixels of a rasterised expanded polygon. The method 800 may be implemented by the renderer module 205. As described above, the renderer module 205 may be formed by one or more software code modules of the controlling program 181.

The result of step 504 of the method 500 is, in general, an area-intersect rasterisation of the graphic object. However, there are three situations in which a pixel does not adhere to the area-intersect pixel placement rule. The method 800 detects the pixels that are violating (i.e., do not adhere) to the area-intersect pixel placement rule and excludes such pixels from the output pixels used to render the graphic object. Examples of applying the method 800 will be described below with reference to FIGS. 9 to 11. As described below, the method 800 is configured for excluding pixels outside a clipping box (or having a sampling point outside bounds of the clipping box), where the clipping box is placed around the graphical object represented by the original polygon (e.g., 710). Pixels outside the clipping box placed around a graphical object are excluded from pixels to be rendered.

The method 800 starts at clipping box step 801, where pixels of the original polygon (e.g., 710) that are outside a clipping box are excluded by the renderer module 205 under execution of the controller processor 170. Rasterising the expanded polygon (e.g., the polygon defined by expanded edges 731, 732 and 733) may produce pixels that do not touch or overlap the original polygon (e.g., 710). The pixels that do not touch or overlap the original polygon are located towards the corners of the expanded polygon.

At clipping box step 801, the pixels that do not touch or overlap the original polygon (e.g., 710) may be excluded by placing a "clipping box" around the original polygon 710 as will be described below. The clipping box is a rectangle with edges parallel to the x- and y-axes. The edges of the clipping box are 0.5 pixels less than and greater than the minimum and maximum edges of the bounding box of the polygon, respectively. The application of the clipping box will be described in further detail below with reference to FIG. 9.

At open-ness step 802, pixels that fail the open-ness rules are excluded by the renderer module 205 under execution of the controller processor 170. Open-ness rules specify what should happen if a pixel (either a centre or outline of the pixel) and polygon outline touch, but do not overlap. A pixel and a polygon touch if their outlines join at one or more points, but the areas within their outlines do not overlap (intersect). Open-ness is important for pixel accuracy. In accordance with the described methods, the open-ness rule specifies that if a pixel and a polygon touch, but do not overlap, the pixel should not be activated. Step 802 may be used for excluding pixels that touch the original polygon representing the graphic object but do not overlap the graphic object. If any pixel touches an edge of the original polygon without overlapping the original polygon, a sampling point of the touching pixel is intersected by an edge of the expanded polygon.

Pixels outside the expanded polygon are excluded in accordance with the centre-intersect pixel placement rule as at the centre-intersect rasteriser step 504. Therefore, at open-ness step 802, pixels whose centre points are either intersected by one of the expanded edges or are encompassed by (or inside) the expanded polygon (e.g., the polygon defined by expanded edges 731, 732 and 733) are received by the renderer module 205 and may be stored within the memory 190. If the expanded polygon is encompassing a centre point of a pixel (i.e., the centre point is inside the expanded polygon), the area of the pixel overlaps the graphic object according to the area-intersect pixel placement rule. However, if the centre point of the pixel is intersected by one of the expanded edges, the pixel touches the graphic object, but does overlap the graphic object. The pixel should therefore not be activated.

At open-ness step 802, the renderer module 205 under execution of the controller processor 170 determines, for every pixel, if the centre point of the pixel is intersected by one of the expanded edges. Step 802 may be performed using any suitable method. If a pixel is intersected by an expanded edge of the expanded polygon, the pixel is excluded at step 802, ensuring that the pixel will not be activated. The open-ness step 802 will be described in more detail below with reference to FIG. 10.

The method 800 continues at overlap step 803, where pixels that have already been activated for the graphic object represented by the original polygon (e.g., 710) are excluded (e.g., discarded from memory 190). If the graphic object is a part of a larger graphic object that has been tessellated, at overlap step 803, all pixels activated by the larger graphic object are considered by the renderer module 205, under execution of the controller processor 170. Step 803 is performed to prevent repeated compositing of a single pixel when the graphic object is transparent. If a single pixel is composited multiple times, an incorrect colour may result.

In one arrangement, step 803 uses a one (1) bit per pixel mask configured within the memory 190. The mask comprises elements used to record the pixels that have already been activated for the graphic object. Before rendering the first pixel of the graphic object, the controller processor 170 may perform the step of initialising the mask such that each element of the mask contains a value indicating that a corresponding pixel has not yet been activated. That is, for the initialised mask, each of the elements of the mask is set to a value indicating that no pixels have been activated. The controller processor 170 may be configured for determining if one of the pixels has previously been activated by checking if the corresponding element of the mask indicates that the pixel has previously been activated; and setting the corresponding element of the mask to indicate that the pixel has previously been activated, in the case that the pixel has not previously been activated.

If a value of one of the elements of the mask indicates that the corresponding pixel has already been activated, at step 803 the pixel is excluded (i.e., excluding the pixel in the case that the pixel has previously been activated). Accordingly, step 803 may be used for excluding pixels that have previously been activated while rendering the graphic object represented by the original polygon. Otherwise, the pixel is not excluded, and the corresponding element of the mask configured within the memory 190 is updated to indicate that the pixel has been activated. Step 803 may be implemented efficiently using the OpenGL stencil buffer component of the OpenGL pipeline.

Figure 9:
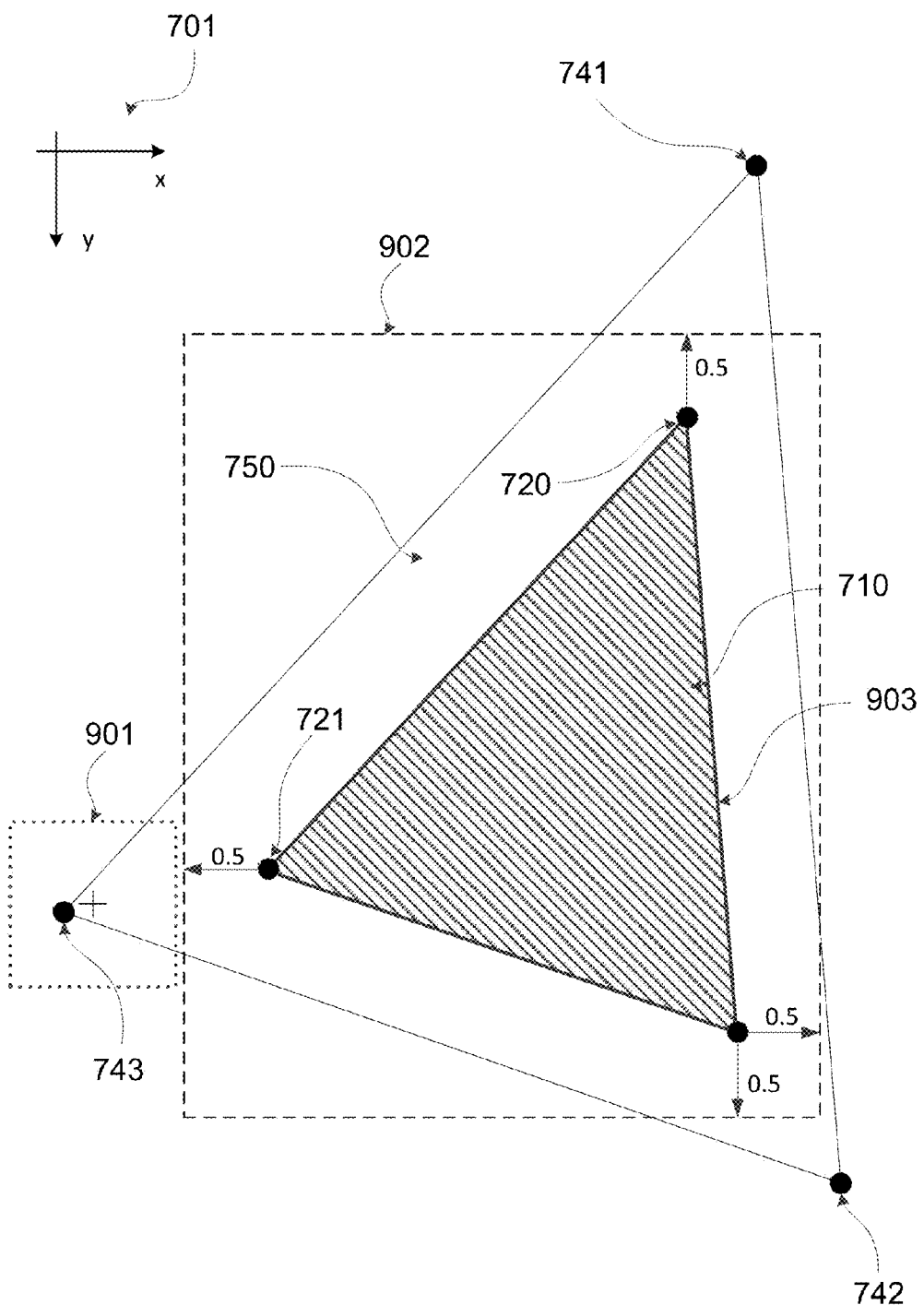
FIG. 9 shows an example of applying a clipping box to exclude pixels that should not be rendered.

The method 800 concludes upon completion of step 803. When the method 800 concludes, all pixels that violate (i.e., do not adhere to) the area-intersect pixel placement rule are excluded from the output. For example, the pixels that that violate the area-intersect pixel placement rule may be discarded from memory 190. An example of applying a clipping box 902, as at clipping box step 801 of the method 800, will now be described with reference to FIG. 9. As seen in FIG. 9, a pixel 901 with a dotted outline has a centre within expanded polygon 750 (i.e., the expanded polygon 750 is encompassing the centre of the pixel 901). Therefore, at centre-intersect rasteriser step 504 of the method 500, the pixel 901 will be output to memory 190, for example. However, the area of pixel 901 clearly does not intersect the area of the original polygon 710. Pixel 901 should therefore not be produced in accordance with the area-intersect placement rule.

At clipping box step 801, pixel 901 is excluded by placing a clipping box 902 around the original polygon 710. Step 801 may be used for calculating the clipping box 902 and for placing the clipping box around the graphic object represented by the original polygon 710. The horizontal edge of the clipping box 902 having the minimum y-value has a y-value that is 0.5 pixels less than the vertex 720 of the original polygon 710 that has the minimum y-value (according to the coordinate system 701). The vertical edge of the clipping box 902 having the minimum x-value has an x-value that is 0.5 pixels less than the vertex 721 of the original polygon 710 that has the minimum x-value. Horizontal and vertical edges that have maximum x-values and y-values are treated similarly. Accordingly, each edge of the clipping box is formed such that each edge has an x-value or y-value that is 0.5 pixels greater than or less than maximum or minimum vertices of the graphic object, depending on whether the edge of the clipping box is horizontal or vertical. Any pixel that has a centre outside the clipping box 902 is excluded (e.g., discarded from memory 190) at clipping box step 801.

An example of applying the open-ness step 802 of the method 800 will now be described with reference to FIG. 10. The purpose of open-ness step 802 is to ensure that the open-ness rules of the area-intersect pixel placement rule are adhered to. To implement the open-ness rules, edges and vertices of graphic objects, and pixels, are often treated as being "open" or "closed". Open edges and vertices are considered not to be part of a polygon or pixel, while closed edges and vertices are considered part of the polygon or pixel. Commonly, the edges and vertices with minimum x- and y-values (with respect to both the x and y axes, respectively) are treated as inside the polygon (closed), while the edges and vertices with maximum x-values and y-values are treated as outside the polygon (open), according to a scan direction.

Figure 10:
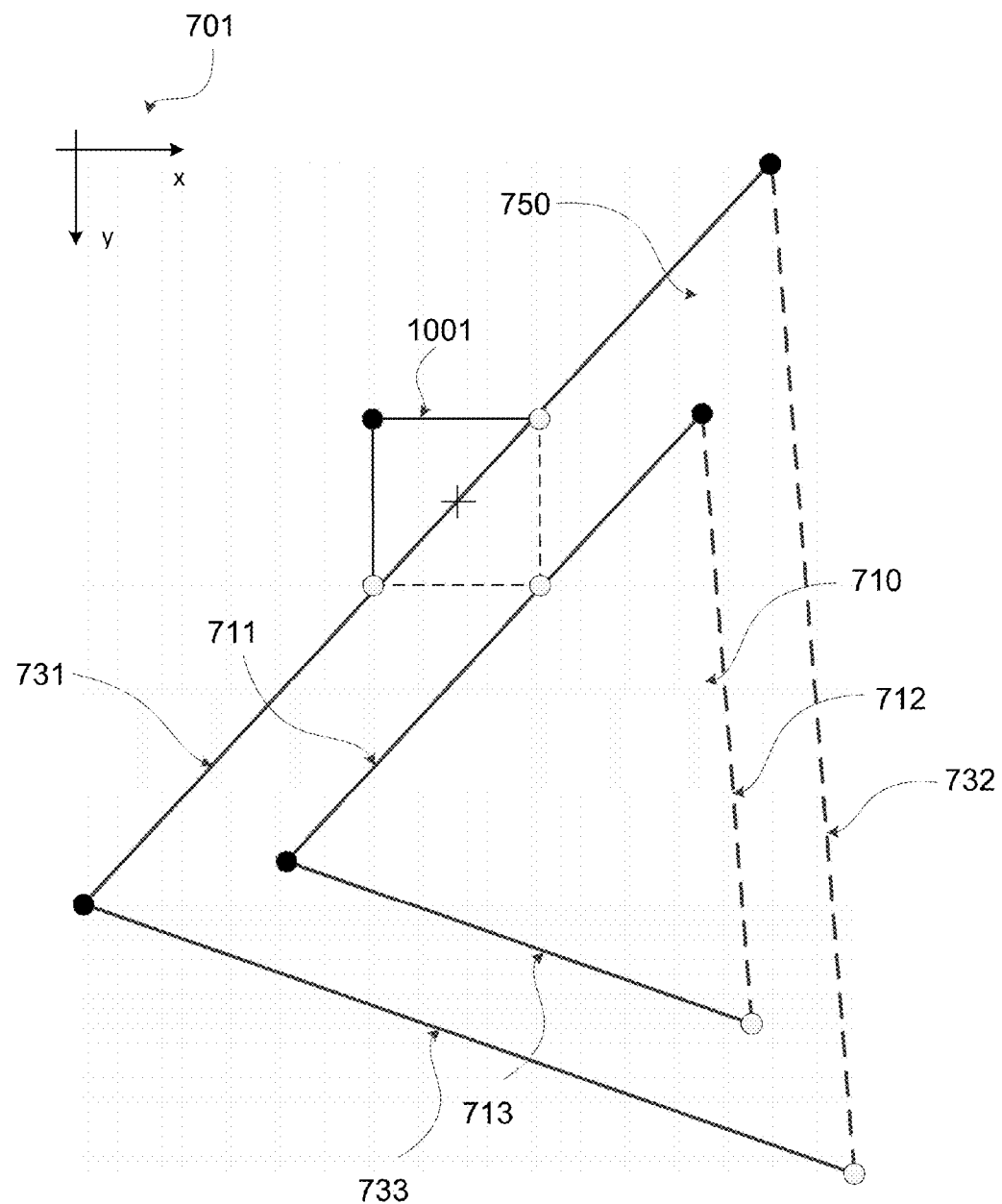
FIG. 10 shows an example of applying an open-ness test to exclude pixels that should not be rendered.

In the example shown in FIG. 10, original edges 711 and 713, and expanded edges 731 and 733 are considered closed, as the edges 711, 713, 731 and 733 have minimum x-values (with respect to the coordinate system 701). Original edge 712 and expanded edge 732 are considered open, as the edge 712 and 732 have maximum x-values. Similar concepts are applied to the vertices of original polygon 710 and expanded polygon 750, as shown in FIG. 10. Similar concepts are also applied to the edges and vertices of pixels, such as pixel 1001.

The centre of pixel 1001 is intersected by the expanded edge 731 of the expanded polygon 750. As expanded edge 731 is closed, at centre intersect rasteriser step 504 of the method 500, the pixel 1001 will be output to memory 190. However, pixel 1001 touches original polygon 710 (at edge 711), without overlapping the original polygon 710. Therefore, according to the area-intersect pixel placement rule, pixel 1001 should not be activated. At open-ness step 802, pixel 1001 is excluded by determining that a centre of the pixel 1001 is intersected by expanded edge 731, and the pixel 1001 is discarded from memory 190. Step 802 excludes any pixel that has a centre intersected by any expanded edge.

Figure 11:
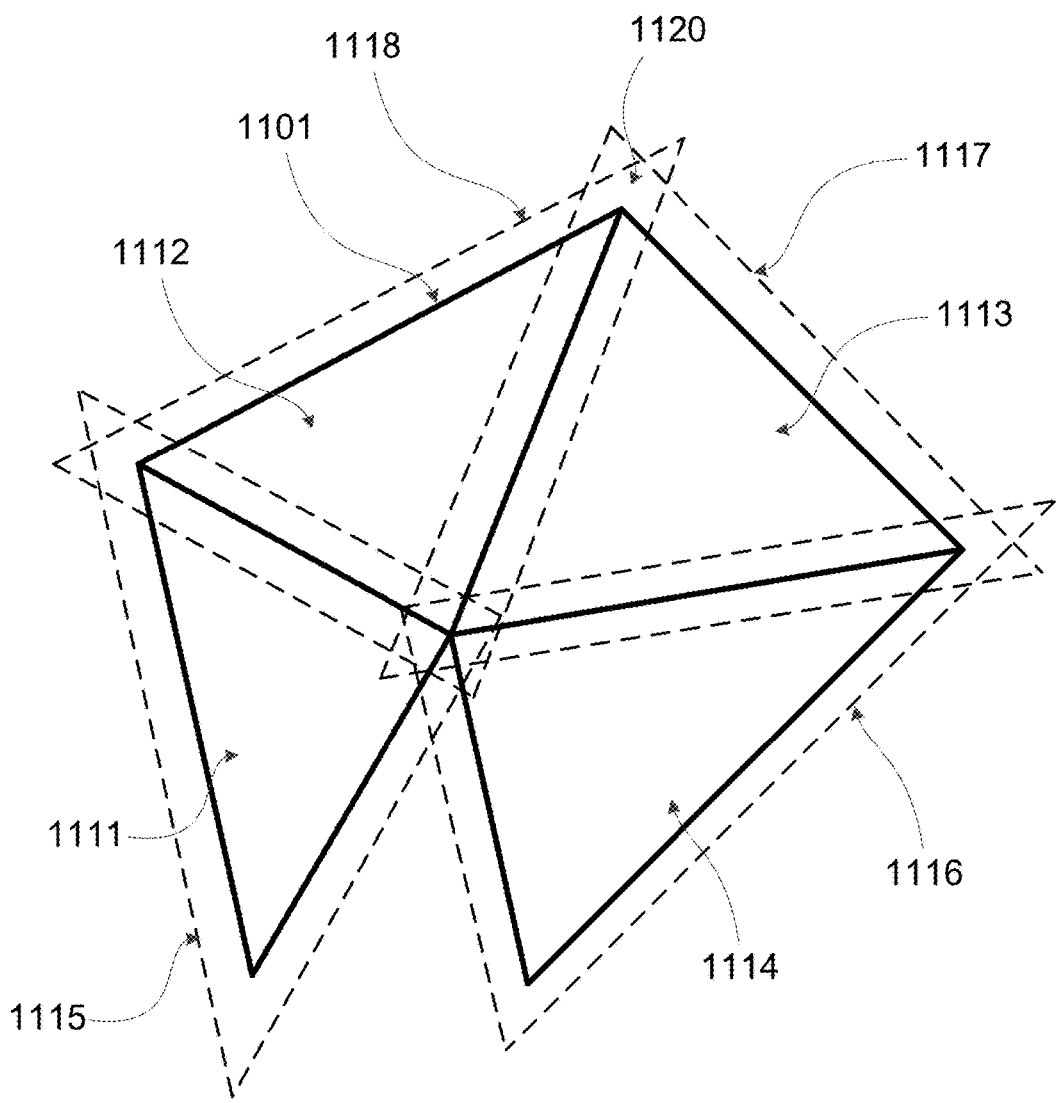
FIG. 11 shows an example of applying the overlap test to exclude pixels that should not be rendered.

An example of applying the overlap step 803 of the method 800 will now be described with reference to FIG. 11. In the example of FIG. 11, one graphic object 1101 has been tessellated, resulting in four polygons 1111-1114. At expansion step 503 of the method 500, four expanded polygons 1115, 1116, 1117 and 1118 are produced, which are shown in FIG. 11 with dashed edges. As seen in FIG. 11, there are many areas in which the expanded polygons 1115, 1116, 1117 and 1118 partially overlap each other. An example of an area 1120 in which the two expanded polygons 1117 and 1118 overlap is shown in FIG. 11. The pixels in such overlapping areas will be activated multiple times, once for each expanded polygon that the pixel belongs to. If the fill of the graphic object 1101 is transparent, the transparent colour will be composited multiple times for the pixels in the overlapping areas. The compositing of the colour multiple times may result in an incorrect colour for the pixels in the overlapping areas.

At overlap step 803, any pixel belonging to the expanded polygons 1115, 1116, 1117 and 1118 of object 1101 is prevented from being activated more than once. The first time a particular pixel is activated, a mask attribute corresponding to the activated pixel is set using a corresponding bit. If an attempt to activate the same pixel a second time is made, at step 803 the corresponding bit in the mask is checked to determine that the corresponding bit is already set. At overlap step 803, the pixel is prevented from being activated a second time by excluding the pixel. The corresponding bit in the mask is left set, so that the pixel can be excluded again if required.

Figure 16:
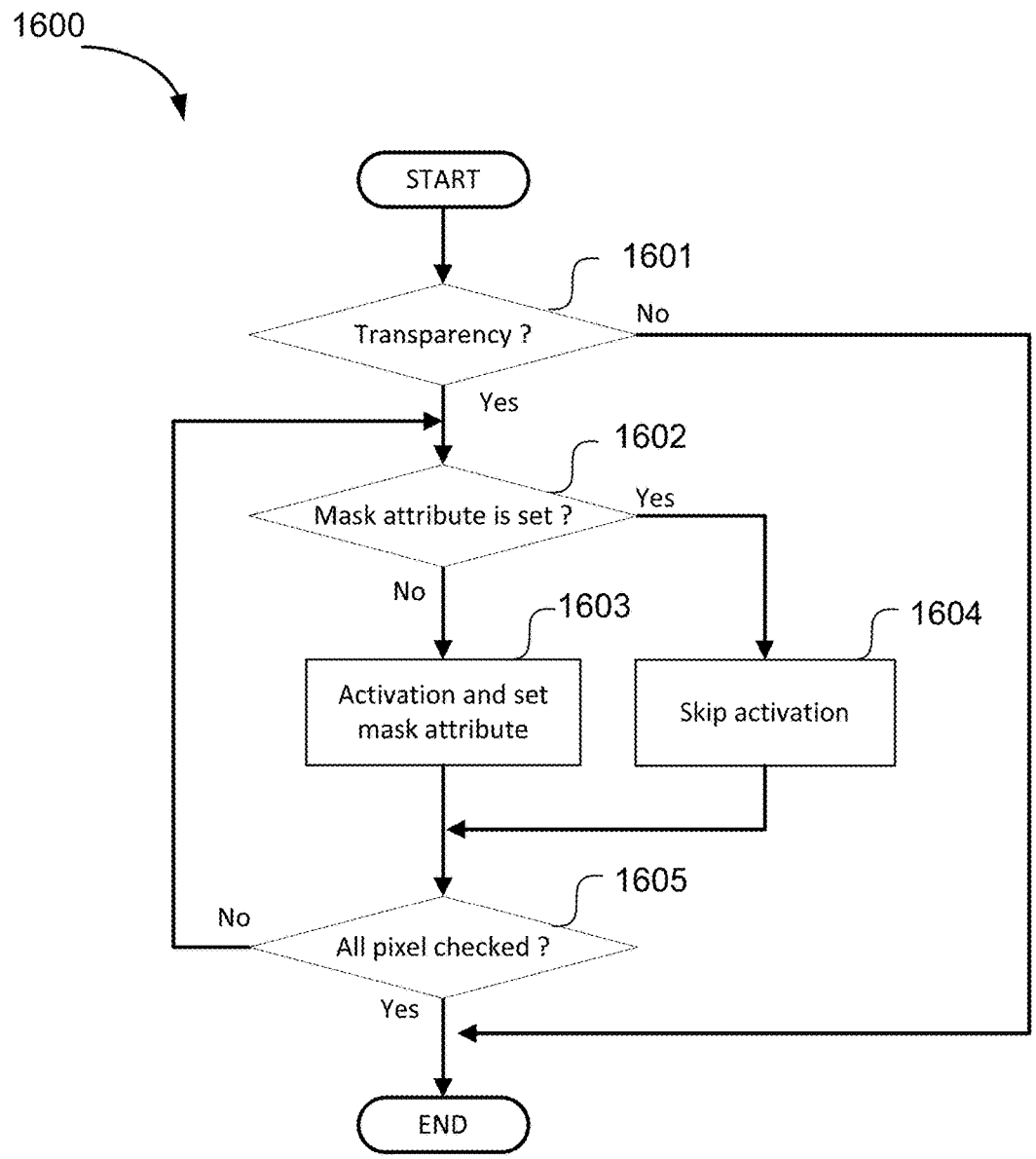
FIG. 16 is a flowchart showing a method of excluding a pixel from pixels to be rendered.

The method 1600 of excluding a pixel from pixels to be rendered, as executed at step 803, will now be described with reference to FIG. 16. The method 1600 avoids rasterising pixels of the rasterised expanded polygons incorrectly. The method 1600 is implemented by the renderer module 205. As described above, the renderer module 205 is formed by one or more software code modules of the controlling program 181.

At decision step 1601, the renderer module 205, under execution of the controller processor 170, is used for determining if the graphic object 1101 has partial transparency or is opaque. The renderer module 205 makes the determination at step 1601 by checking an attribute of the object 1101. If the object 1101 is a partially transparent object, then the method 1600 proceeds to decision step 1602. If the renderer module 205 determines that object 1101 is an opaque object at step 1601, then the method 1600 concludes and all of the pixels in the expanded polygon 1115, 1116, 1117 and 1118 are activated (rendered) normally.

At decision step 1602, the renderer module 205, under execution of the controller processor 170, determines if a mask attribute is set for a first pixel to be activated (rendered). The mask attribute is used for indicating that the pixel has previously been activated (rendered). As such, if the mask attribute is set, then the pixel has previously been rendered. If the renderer module 205 determines at step 1602 that the mask attribute is not set for the pixel, then the method 1600 proceeds to activation step 1603.

At step 1603, the pixel is activated (rendered) and a new mask attribute for the activated pixel is set. If the renderer module 205 determines at step 1602 that the mask attribute of the pixel is set for the pixel, then the method 1600 proceeds to step 1604. At step 1604, the activation for the pixel is skipped so that the pixel is excluded from the pixels to be rendered.

At decision step 1605, the renderer module 205, under execution of the controller 170, determines if remaining pixels to be processed exist. If the renderer module 205 determines at step 1605 that at least one remaining pixel exists, then the method 1600 returns to step 1602 and step 1602 is repeated for a next pixel.

Figure 12A:
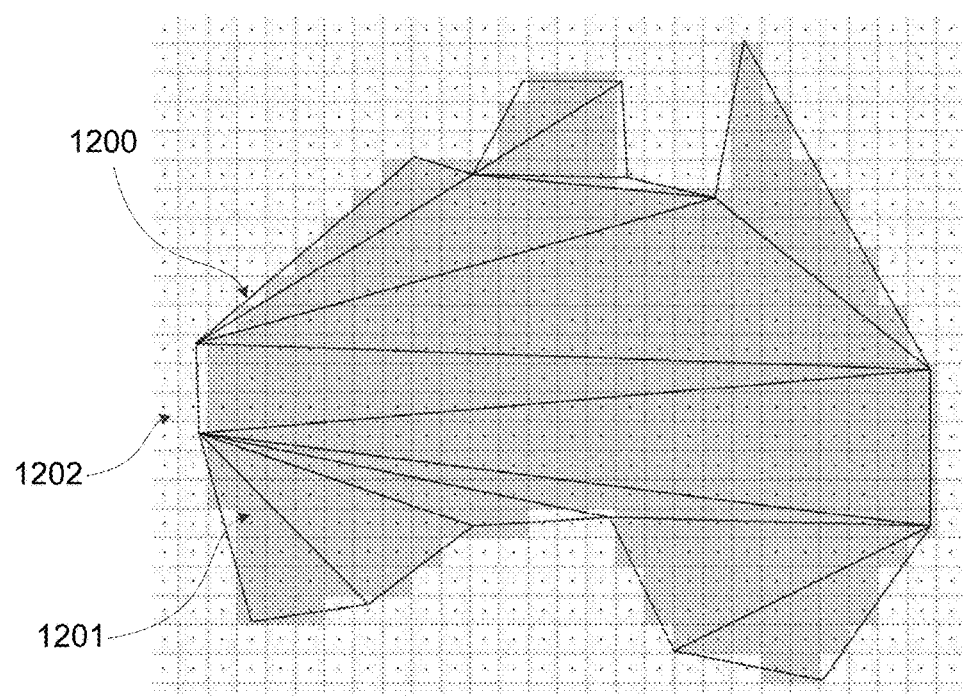
FIG. 12A shows an example of a graphic object rendered in accordance with the centre-intersect pixel placement rule.

FIG. 12A shows an example of a raster image representation rendered in accordance with the centre-intersect pixel placement rule. Pixels (e.g., 1201) that are activated by a graphic object 1200 are shown as shaded, while pixels (e.g., 1202) that are not activated by the graphic object 1200 are shown as white. The graphic object 1200 has been tessellated to produce fifteen (15) polygons as seen in FIG. 12A. Only the pixels (e.g., 1201) whose centres are encompassed by (i.e., are inside) the bounds of the graphic object 1200 are activated. The pixels (e.g., 1201) whose centres are encompassed by (or are inside) the bounds of the graphic object 1200 adhere to the centre-intersect pixel placement rule.

Figure 12B:
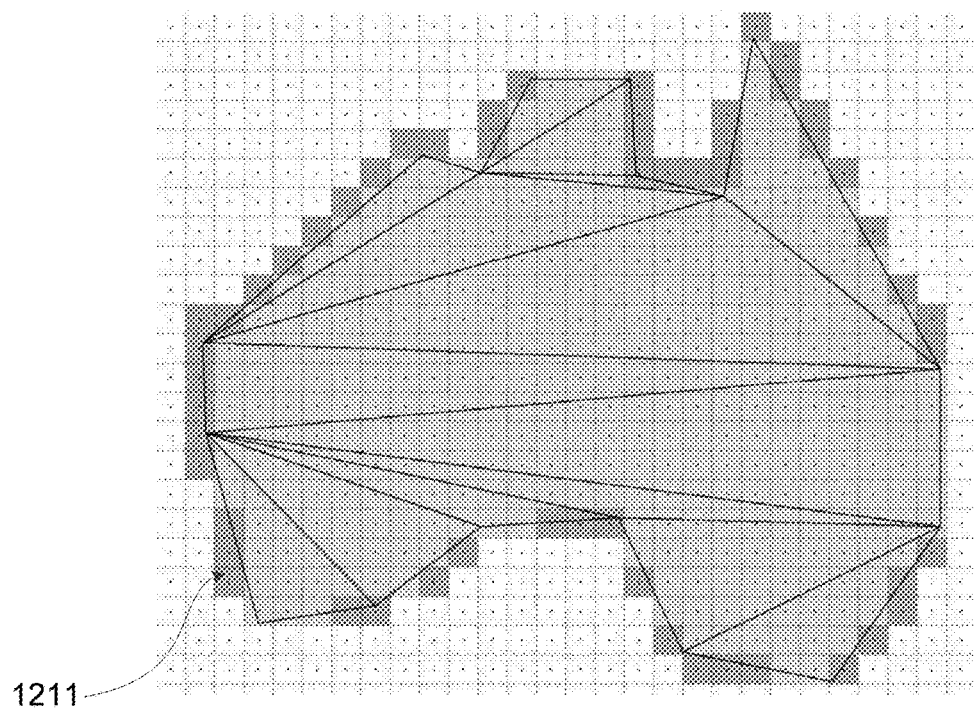
FIG. 12B shows an example of a graphic object rendered in accordance with the area-intersect pixel placement rule.

FIG. 12B shows an example of a raster image representation rendered in accordance with the area-intersect pixel placement rule (e.g., using an area-intersect renderer, such as the renderer module 205), in accordance with the method 500. An area-intersect renderer activates extra pixels in addition to the pixels activated by a centre-intersect renderer. The additional activated pixels (e.g., 1211) are shown in FIG. 12B as shaded darkly. In order to accurately render PostScript and PDF documents, the additional pixels (e.g., 1211) need to be activated.

Figure 13:
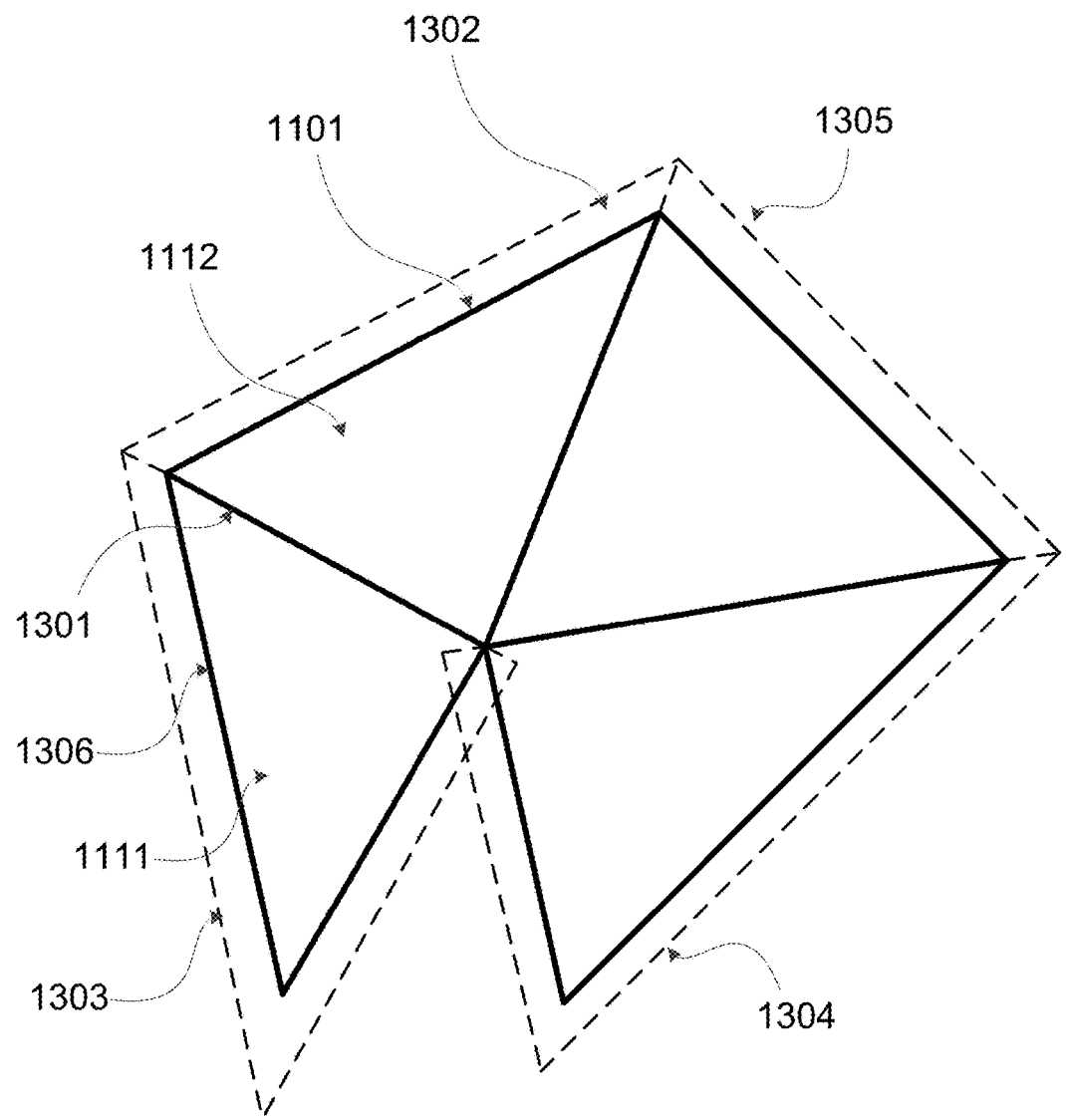
FIG. 13 shows an example of a graphic object where endpoints of internal edges are left unmoved.

Rather than moving all edges outwards as described above with reference to step 601 of the method 600, in one arrangement, internal edges of a tessellated graphic object may be treated differently. An internal edge of a tessellated graphic object is an edge that separates to two adjacent polygons produced by the tessellation, rather than the interior and exterior of the graphic object. Referring to FIG. 13, polygons 1111 and 1112 of graphic object 1101 are adjacent, and are separated by internal edge 1301.

In one arrangement as shown in FIG. 13, internal edges are not expanded at step 601 of the method 600. Rather, endpoints of the internal edges are left unmoved, so that an edge of the expanded polygon is formed using an existing unmoved edge of the original polygon in the case that the edge is interior to the original polygon. Expanded polygons 1302, 1303, 1304 and 1305, shown in FIG. 13 with dashed edges, are smaller, and therefore require less processing in following steps 504-506 of the method 500. Leaving the internal edges unmoved, as described above, may improve performance of the renderer module 205.

Step 503 of the method 500 outputs a single expanded polygon for each input polygon. The expanded polygons 1302, 1303, 1304 and 1305 overlap the entire area of the input polygon 1101, and includes an additional area so that at the centre-intersect rasteriser step 504 all pixels that should be activated according to the area-intersect pixel placement rule are produced. Rather than outputting a single expanded polygon, at expansion step 503, the original polygon as well as additional polygons that overlap the additional area required by the area-intersect pixel placement rule may be output.

Figure 15:
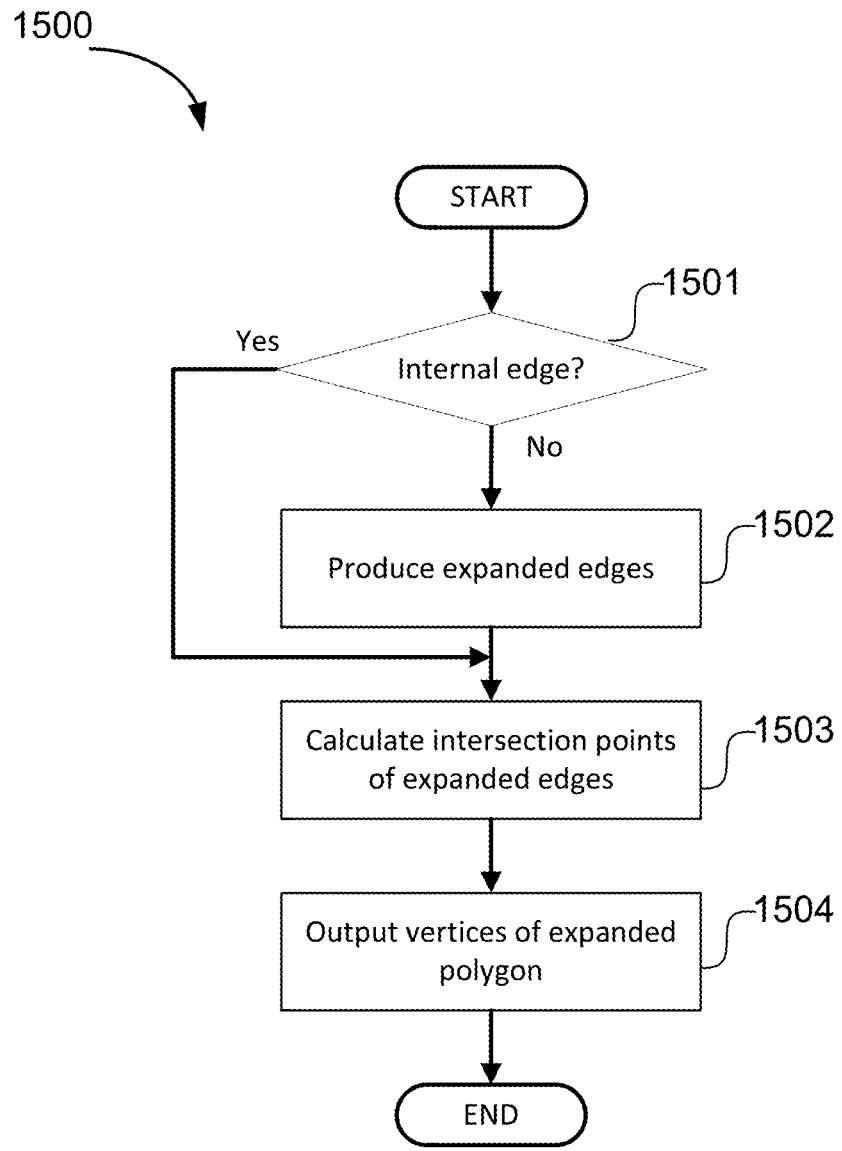
FIG. 15 is a flowchart showing a method of using external edges for edge expansion.

FIG. 15 is a flowchart showing a method 1500 of using external edges for edge expansion, as executed at step 503. The method 1500 will be described by way of example with reference to the object 1101 of FIG. 11. The method 1500 described in FIG. 15 reduces computational cost by applying edge expansion only to external edges of the expanded polygons. The method 1500 is implemented by the renderer module 205. As described above, the renderer module 205 is formed by one or more software code modules of the controlling program 181.

The method 1500 begins at decision step 1501, where the renderer module 205 determines if a current edge to be processed is an edge which is internally within the input object 1101. If the current edge is within the input object 1101 (e.g. edge 1301), edge expansion steps can be skipped and the method 1500 proceeds to step 1503. If the renderer module 205 determines that the current edge is an external edge which configures a part of an edge of the input object 1101 (e.g. edge 1306), then the method 1500 proceeds to expansion step 1502. At step 1502, the render module 205 is used for moving endpoints of the current edge in the direction of the normal of the edge by (±0.5, ±0.5), as described above with in step 601. As such, expanded polygons are formed by moving edges which are not internally within the input object 1101.

At step 1503, the intersection points of the expanded edge and other expanded edges are determined by the renderer module 205 as described above in step 602. Then at step 1504, vertices of the expanded polygon corresponding to the expanded edges are output to the next step 504 of the method 500 as described above in step 603.

Figure 14:
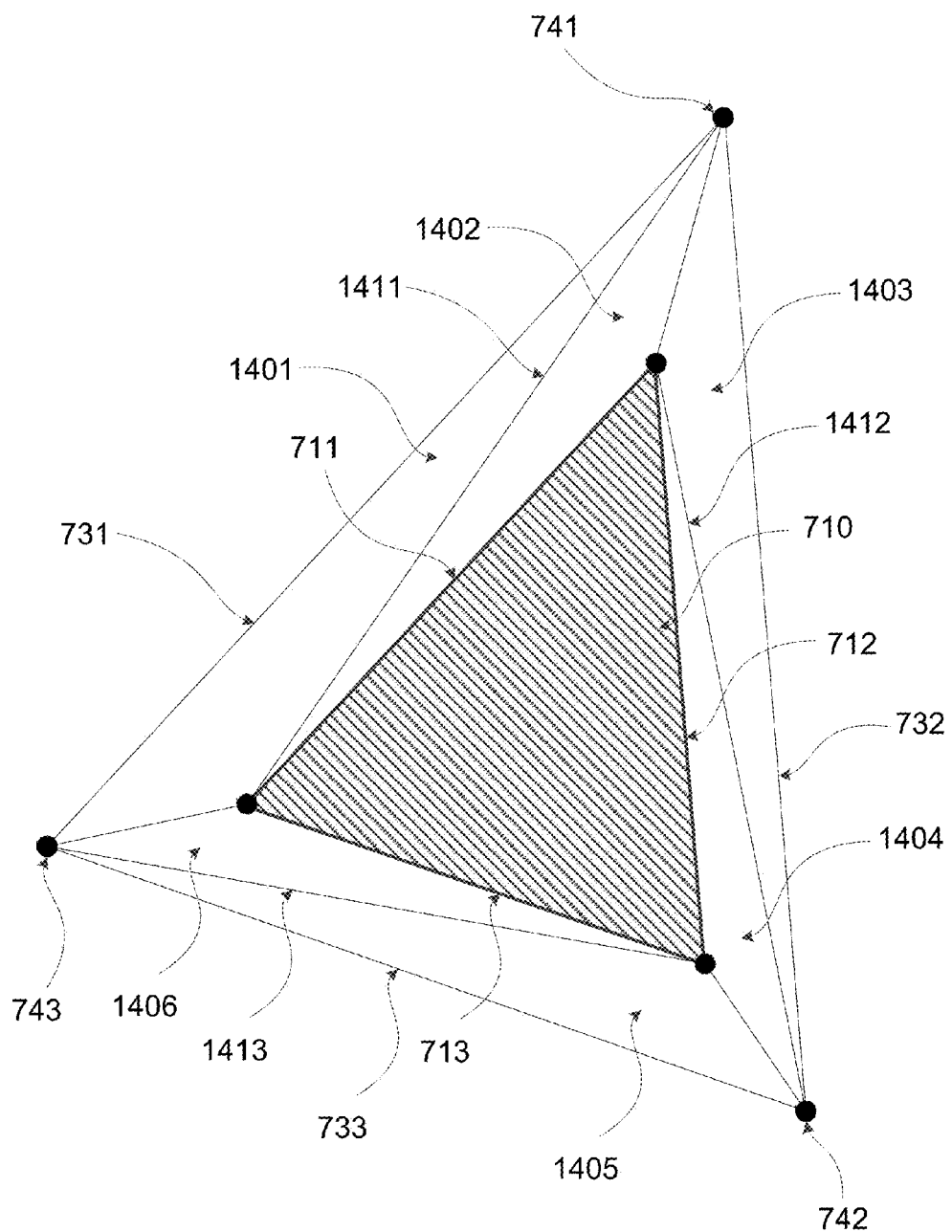
FIG. 14 shows an example where polygons of an expanded graphic object are output.

As seen in FIG. 14, expanded edges 731-733 are produced at step 601 of the method 600, or as described previously with reference to FIG. 13. In one arrangement, rather than outputting the expanded polygon defined by the expanded edges 731-733, at step 603, the original triangle 710 and six polygons 1401-1406 defined by the original edges 711-713, expanded edges 731-733, and edges between original and expanded vertices 1411-1413, may be output.

The advantage of the arrangement described with reference to FIG. 14 is that the original polygon 710, which often activates the most pixels, does not need to be processed in accordance with the method 800. In the arrangement of FIG. 14, the original polygon 710 is rendered in accordance with the centre-intersect pixel placement rule, while the additional polygons 1401-1406 are processed in accordance with the method 800. The additional polygons 1401-1406 will activate the pixels whose area overlaps the original polygon 710, in accordance with the area-intersect pixel placement rule.

The arrangements described above with reference to FIGS. 5 to 16 may be applied to rendering systems that contain rasterisers that sample graphic objects at locations other than pixel centres. For example, a rasteriser may perform rasterisation in a similar manner to a centre-intersect rasteriser. However, rather than sampling the graphic object 710 at pixel centres, the graphic object 710 may sample at pixel corners. To apply the method 500 to such a rendering system, step 601 of the method 600 expands each edge by the distance to an upper-left corner of a pixel, if the pixel is touching the edge without overlapping the object, rather than (±0.5, ±0.5). In this instance, calculation of a clipping box at step 801 of the method 800 may be adjusted in a similar manner.

INDUSTRIAL APPLICABILITY

The arrangements described are applicable to the computer and data processing industries and particularly for the rendering of graphic objects.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of rendering a graphic object, the method comprising:
    tessellating the graphic object into a plurality of original polygons;
    forming a plurality of expanded polygons based on the plurality of original polygons, the expanded polygons encompassing sampling points of pixels touched by edges of the graphic object;
    rendering the plurality of expanded polygons in accordance with a centre-intersect pixel placement rule as applied to the plurality of expanded polygons; and
    excluding pixels which are rendered by the rendering of the plurality of expanded polygons and which violate an area-intersect pixel placement rule as applied to the plurality of original polygons.

2. The method according to claim 1, wherein the pixels excluded from pixels to be rendered have previously been activated.

3. The method according to claim 1, wherein the rendering step comprising:
    determining if the graphic object has transparency; and
    if the graphic object has transparency, determining if a mask attribute is set for a pixel to be rendered, the mask attribute indicating that the pixel has previously been rendered;
    wherein the pixel is excluded from the pixels to be rendered if the attribute is set.

4. The method according to claim 1, wherein a plurality of expanded polygons partially overlap each other.

5. The method according to claim 1, wherein the forming comprises:

determining whether edges of the plurality of original polygons are internally within the graphic object;

wherein the plurality of expanded polygons are formed by moving the edges which are not internally within the graphic object.

6. The method according to claim 1, wherein the forming comprises a step of moving endpoints of an edge of the expanded polygon by a distance from an endpoint to a pixel sampling point in a direction of a normal of the edge of the expanded polygon.

7. The method according to claim 6, further comprising moving endpoints of each edge of the expanded polygon by (±0.5 pixels, ±0.5 pixels).

8. The method according to claim 1, wherein pixels outside a clipping box placed around one of the plurality of original polygons are excluded from pixels to be rendered.

9. The method according to claim 8, wherein each edge of the clipping box is formed such that each edge has an x-value or y-value that is 0.5 pixels greater than or less than maximum or minimum vertices of the one of the plurality of original polygons, depending on whether the edge of the clipping box is horizontal or vertical.

10. The method according to claim 1, wherein pixels that touch the graphic object but do not overlap the graphic object are excluded from pixels to be rendered.

11. The method according to claim 10, wherein the rendering comprises:

determining if a sampling point of a pixel is intersected by an edge of the expanded polygon; and excluding the pixel from the pixels to be rendered if the sampling point is intersected by an edge of the expanded polygon.

12. The method according to claim 1, wherein the sampling points of the pixels are the centre of pixels or a corner of the pixels.

13. The method according to claim 1, wherein an expanded polygon is formed for each of the plurality of original polygons based on at least one adjacent polygon from the plurality of original polygons.

14. The method according to claim 1, further comprising identifying pixels of a rendered expanded polygon which violate the area-intersect pixel placement rule, as applied to the plurality of original polygons, with respect to a corresponding non-expanded polygon.

15. An apparatus for rendering a graphic object, the apparatus comprising:

a memory for storing data and instructions;

a processor coupled to the memory for executing the instructions to perform operations comprising:

tessellating the graphic object into a plurality of original polygons;

forming a plurality of expanded polygons based on the plurality of original polygons, said expanded polygon encompassing sampling points of pixels touched by edges of the graphic object;

rendering the plurality of expanded polygons in accordance with a centre-intersect placement rule as applied to the plurality of expanded polygons; and excluding pixels which are rendered by the rendering of the expanded polygons and which violate an area-intersect pixel placement rule as applied to the plurality of original polygons.

16. The apparatus according to claim 15, wherein the pixels excluded from pixels to be rendered have previously been activated.

17. The apparatus according to claim 15, wherein the rendering comprises:

determining if the graphic object has transparency; and if the graphic object has transparency, determining if a mask attribute is set for a pixel to be rendered, the mask attribute indicating that the pixel has previously been rendered;

wherein the pixel is excluded from the pixels to be rendered if the attribute is set.

18. The apparatus according to claim 15, wherein the forming comprises:

determining whether edges of the plurality of original polygons are internally within the graphic object;

wherein the plurality of expanded polygons are formed by moving the edges which are not internally within the graphic object.

19. A non-transitory computer readable medium having a computer program stored thereon for rendering a graphic object, the program comprising a code to execute operations comprising:

tessellating the graphic object into a plurality of original polygons;

forming a plurality of expanded polygons based on the plurality of original polygons, said the plurality of expanded polygons encompassing sampling points of pixels touched by edges of the graphic object;

rendering the plurality of expanded polygons in accordance with a centre-intersect placement rule as applied to the plurality of expanded polygons; and excluding pixels which are rendered by the rendering of the expanded polygons and which violate an area-intersect pixel placement rule as applied to the plurality of original polygons.

20. The non-transitory computer readable medium according to claim 19, wherein the pixels excluded from pixels to be rendered have previously been activated.

21. The non-transitory computer readable medium according to claim 19, wherein the rendering operation comprises operations of:

determining if the graphic object has transparency; and if the graphic object has transparency, determining if a mask attribute is set for a pixel to be rendered, the mask attribute indicating that the pixel has previously been rendered;

wherein the pixel is excluded from the pixels to be rendered if the attribute is set.

22. The non-transitory computer readable medium according to claim 19, wherein the forming operation comprises operations of:

determining whether edges of the plurality of original polygons are internally within the graphic object;

wherein the plurality of expanded polygons are formed by moving the edges which are not internally within the graphic object.

* * * * *